(12) United States Patent
Andriola et al.

(10) Patent No.: US 12,544,010 B2
(45) Date of Patent: Feb. 10, 2026

(54) SYSTEMS AND METHODS FOR ELECTRICAL MONITORING OF IMPLANTABLE DEVICES

(71) Applicant: Shifamed Holdings, LLC, Campbell, CA (US)

(72) Inventors: Peter Andriola, Castro Valley, CA (US); Brian Fahey, Menlo Park, CA (US)

(73) Assignee: Shifamed Holdings, LLC, Campbell, CA (US)

( * ) Notice: Subject to any disclaimer, the term of this patent is extended or adjusted under 35 U.S.C. 154(b) by 383 days.

(21) Appl. No.: 18/248,668

(22) PCT Filed: Oct. 27, 2021

(86) PCT No.: PCT/US2021/056794
§ 371 (c)(1),
(2) Date: Apr. 11, 2023

(87) PCT Pub. No.: WO2022/093918
PCT Pub. Date: May 5, 2022

(65) Prior Publication Data
US 2024/0032869 A1    Feb. 1, 2024

Related U.S. Application Data

(60) Provisional application No. 63/106,743, filed on Oct. 28, 2020.

(51) Int. Cl.
*A61B 5/00* (2006.01)
*A61B 5/026* (2006.01)
(Continued)

(52) U.S. Cl.
CPC .............. *A61B 5/686* (2013.01); *A61B 5/026* (2013.01); *A61B 5/0538* (2013.01); *A61B 5/1076* (2013.01); *A61B 2562/0271* (2013.01)

(58) Field of Classification Search
None
See application file for complete search history.

(56) References Cited

U.S. PATENT DOCUMENTS

| | | |
|---|---|---|
| 3,874,388 A | 4/1975 | King et al. |
| 4,601,309 A | 7/1986 | Chang |

(Continued)

FOREIGN PATENT DOCUMENTS

| | | |
|---|---|---|
| AU | 2005211243 | 8/2005 |
| AU | 2010344182 | 8/2012 |

(Continued)

OTHER PUBLICATIONS

Jodi Perkins, "Corvia Medical and physIQ Partner in Global Phase 3 Heart Failure Clinical Trial to Leverage Novel Digital Endpoints," Press Release, 2019 Copyright, Medical Alley Association, 3 pages.

(Continued)

*Primary Examiner* — Yi-Shan Yang
(74) *Attorney, Agent, or Firm* — Perkins Cole LLP

(57) ABSTRACT

The present technology relates to shunting systems and methods. In some embodiments, the present technology includes a method for monitoring a shunting element implanted in a patient and having a lumen fluidly coupling two body regions. The method can comprise applying an electrical input to a first contact region and a second contact region of the shunting element. The method can also include measuring an electrical output that results from the electrical input. The method can further include calculating, via the processor, an electrical parameter associated with the shunting element based, at least in part, on the electrical output. The electrical parameter can vary based on a size of the lumen of the shunting element. The method can determine, via the processor, the size of a portion of the lumen based, at least in part, on the electrical parameter.

24 Claims, 8 Drawing Sheets

(51) Int. Cl.
  *A61B 5/0538* (2021.01)
  *A61B 5/107* (2006.01)

(56) References Cited

U.S. PATENT DOCUMENTS

| | | | |
|---|---|---|---|
| 4,662,355 A | 5/1987 | Pieronne et al. |
| 4,705,507 A | 11/1987 | Boyles |
| 4,836,204 A | 6/1989 | Landymore et al. |
| 4,969,890 A | 11/1990 | Sugita et al. |
| 4,979,955 A | 12/1990 | Smith |
| 4,995,857 A | 2/1991 | Arnold |
| 5,186,431 A | 2/1993 | Tamari |
| 5,267,940 A | 12/1993 | Moulder |
| 5,290,227 A | 3/1994 | Pasque |
| 5,312,341 A | 5/1994 | Turi |
| 5,326,374 A | 7/1994 | Ilbawi et al. |
| 5,332,402 A | 7/1994 | Teitelbaum |
| 5,334,217 A | 8/1994 | Das |
| 5,409,019 A | 4/1995 | Wilk |
| 5,429,144 A | 7/1995 | Wilk |
| 5,500,015 A | 3/1996 | Deac |
| 5,531,759 A | 7/1996 | Kensey et al. |
| 5,556,386 A | 9/1996 | Todd |
| 5,584,803 A | 12/1996 | Stevens et al. |
| 5,597,377 A | 1/1997 | Aldea |
| 5,645,559 A | 7/1997 | Hachtman et al. |
| 5,655,548 A | 8/1997 | Nelson et al. |
| 5,662,711 A | 9/1997 | Douglas |
| 5,702,412 A | 12/1997 | Popov et al. |
| 5,725,552 A | 3/1998 | Kotula et al. |
| 5,741,297 A | 4/1998 | Simon |
| 5,795,307 A | 8/1998 | Krueger |
| 5,810,836 A | 9/1998 | Hussein et al. |
| 5,824,071 A | 10/1998 | Nelson et al. |
| 5,916,193 A | 6/1999 | Stevens et al. |
| 5,941,850 A | 8/1999 | Shah et al. |
| 5,957,949 A | 9/1999 | Leonhardt et al. |
| 6,023,070 A * | 2/2000 | Wetegrove | G01N 21/532 |
| | | | 250/575 |
| 6,039,759 A | 3/2000 | Carpentier et al. |
| 6,077,298 A | 6/2000 | Tu et al. |
| 6,120,534 A | 9/2000 | Ruiz |
| 6,126,686 A | 10/2000 | Badylak et al. |
| 6,165,188 A | 12/2000 | Saadat et al. |
| 6,210,318 B1 | 4/2001 | Lederman |
| 6,217,541 B1 | 4/2001 | Yu |
| 6,242,762 B1 | 6/2001 | Brown et al. |
| 6,254,564 B1 | 7/2001 | Wilk et al. |
| 6,260,552 B1 | 7/2001 | Mortier et al. |
| 6,270,526 B1 | 8/2001 | Cox |
| 6,277,078 B1 | 8/2001 | Porat et al. |
| 6,302,892 B1 | 10/2001 | Wilk |
| 6,328,699 B1 | 12/2001 | Eigler et al. |
| 6,344,022 B1 | 2/2002 | Jarvik |
| 6,358,277 B1 | 3/2002 | Duran |
| 6,406,422 B1 | 6/2002 | Landesberg |
| 6,447,539 B1 | 9/2002 | Nelson et al. |
| 6,451,051 B2 | 9/2002 | Drasler et al. |
| 6,458,153 B1 | 10/2002 | Bailey et al. |
| 6,468,303 B1 | 10/2002 | Amplatz et al. |
| 6,478,776 B1 | 11/2002 | Rosenman et al. |
| 6,491,705 B2 | 12/2002 | Gifford, III et al. |
| 6,494,889 B1 | 12/2002 | Fleischman et al. |
| 6,527,698 B1 | 3/2003 | Kung et al. |
| 6,544,208 B2 | 4/2003 | Ethier et al. |
| 6,562,066 B1 | 5/2003 | Martin |
| 6,572,652 B2 | 6/2003 | Shaknovich |
| 6,589,198 B1 | 7/2003 | Soltanpour et al. |
| 6,632,169 B2 | 10/2003 | Korakianitis et al. |
| 6,638,303 B1 | 10/2003 | Campbell |
| 6,641,610 B2 | 11/2003 | Wolf et al. |
| 6,652,578 B2 | 11/2003 | Bailey et al. |
| 6,685,664 B2 | 2/2004 | Levin et al. |
| 6,712,836 B1 | 3/2004 | Berg et al. |
| 6,911,043 B2 | 6/2005 | Myers et al. |
| 7,001,409 B2 | 2/2006 | Amplatz |
| 7,011,095 B2 | 3/2006 | Wolf et al. |
| 7,056,294 B2 | 6/2006 | Khairkhahan et al. |
| 7,149,587 B2 | 12/2006 | Wardle et al. |
| 7,175,656 B2 | 2/2007 | Khairkhahan |
| 7,270,675 B2 | 9/2007 | Chun et al. |
| 7,294,115 B1 | 11/2007 | Wilk |
| 7,311,690 B2 | 12/2007 | Burnett |
| 7,311,730 B2 | 12/2007 | Gabbay |
| 7,317,951 B2 | 1/2008 | Schneider et al. |
| 7,390,310 B2 | 6/2008 | McCusker et al. |
| 7,513,908 B2 | 4/2009 | Lattouf |
| 7,524,329 B2 | 4/2009 | Rucker |
| 7,524,330 B2 | 4/2009 | Berreklouw |
| 7,524,332 B2 | 4/2009 | Osborne et al. |
| 7,608,067 B2 | 10/2009 | Bonni |
| 7,665,466 B2 | 2/2010 | Figulla et al. |
| 7,699,059 B2 | 4/2010 | Fonseca et al. |
| 7,736,327 B2 | 6/2010 | Wilk et al. |
| 7,780,725 B2 | 8/2010 | Haug et al. |
| 7,794,473 B2 | 9/2010 | Tessmer et al. |
| 7,806,921 B2 | 10/2010 | Hoffman |
| 7,860,579 B2 | 12/2010 | Goetzinger et al. |
| 7,892,246 B2 | 2/2011 | Akin et al. |
| 7,905,901 B2 | 3/2011 | Corcoran et al. |
| 7,922,764 B2 | 4/2011 | Gordy et al. |
| 7,938,840 B2 | 5/2011 | Golden et al. |
| 7,967,769 B2 | 6/2011 | Faul et al. |
| 7,988,724 B2 | 8/2011 | Salahieh et al. |
| 8,012,198 B2 | 9/2011 | Hill et al. |
| 8,014,865 B2 | 9/2011 | Najafi et al. |
| 8,016,877 B2 | 9/2011 | Seguin et al. |
| 8,043,360 B2 | 10/2011 | McNamara et al. |
| 8,070,708 B2 | 12/2011 | Rottenberg et al. |
| 8,091,556 B2 | 1/2012 | Keren et al. |
| 8,096,959 B2 | 1/2012 | Stewart et al. |
| 8,147,545 B2 | 4/2012 | Avior |
| 8,157,860 B2 | 4/2012 | McNamara et al. |
| 8,172,896 B2 | 5/2012 | McNamara et al. |
| 8,235,916 B2 | 8/2012 | Whiting et al. |
| 8,235,933 B2 | 8/2012 | Keren et al. |
| 8,246,677 B2 | 8/2012 | Ryan |
| 8,252,042 B2 | 8/2012 | McNamara et al. |
| 8,255,062 B2 | 8/2012 | Doan et al. |
| 8,298,240 B2 | 10/2012 | Giger et al. |
| 8,303,511 B2 | 11/2012 | Eigler et al. |
| 8,348,996 B2 | 1/2013 | Tuval et al. |
| 8,398,708 B2 | 3/2013 | Meiri et al. |
| 8,460,366 B2 | 6/2013 | Rowe |
| 8,460,372 B2 | 6/2013 | McNamara et al. |
| 8,597,225 B2 | 12/2013 | Kapadia |
| 8,647,381 B2 | 2/2014 | Essinger et al. |
| 8,696,611 B2 | 4/2014 | Nitzan et al. |
| 8,696,693 B2 | 4/2014 | Najafi et al. |
| 8,740,962 B2 | 6/2014 | Finch et al. |
| 8,745,845 B2 | 6/2014 | Finch et al. |
| 8,747,458 B2 | 6/2014 | Tuval et al. |
| 8,752,258 B2 | 6/2014 | Finch et al. |
| 8,764,848 B2 | 7/2014 | Callaghan et al. |
| 8,827,888 B2 | 9/2014 | Bolyard et al. |
| 8,882,697 B2 | 11/2014 | Celermajer et al. |
| 8,932,247 B2 | 1/2015 | Stergiopulos |
| 8,951,223 B2 | 2/2015 | McNamara et al. |
| D727,501 S | 4/2015 | Heipl |
| 9,005,155 B2 | 4/2015 | Sugimoto |
| 9,034,034 B2 | 5/2015 | Nitzan et al. |
| 9,084,589 B2 | 7/2015 | Moszner |
| 9,138,213 B2 | 9/2015 | Amin et al. |
| 9,179,899 B2 | 11/2015 | Freudenthal |
| 9,205,236 B2 | 12/2015 | McNamara et al. |
| 9,232,997 B2 | 1/2016 | Sugimoto et al. |
| 9,277,995 B2 | 3/2016 | Celermajer et al. |
| 9,333,067 B2 | 5/2016 | McKnight et al. |
| 9,358,371 B2 | 6/2016 | McNamara et al. |
| 9,456,812 B2 | 10/2016 | Finch et al. |
| 9,629,715 B2 | 4/2017 | Nitzan et al. |
| 9,642,993 B2 | 5/2017 | McNamara et al. |
| 9,649,480 B2 | 5/2017 | Sugimoto et al. |
| 9,681,948 B2 | 6/2017 | Levi et al. |

(56) References Cited

U.S. PATENT DOCUMENTS

| | | |
|---|---|---|
| 9,707,382 B2 | 7/2017 | Nitzan et al. |
| 9,713,696 B2 | 7/2017 | Yacoby et al. |
| 9,724,499 B2 | 8/2017 | Rottenberg et al. |
| 9,737,264 B2 | 8/2017 | Braido et al. |
| 9,757,107 B2 | 9/2017 | McNamara et al. |
| 9,775,636 B2 | 10/2017 | Fazio et al. |
| 9,789,294 B2 | 10/2017 | Taft et al. |
| 9,918,677 B2 | 3/2018 | Eigler et al. |
| 9,918,856 B2 | 3/2018 | Favier et al. |
| 9,937,036 B2 | 4/2018 | Sugimoto et al. |
| 9,943,670 B2 | 4/2018 | Keren et al. |
| 9,980,815 B2 | 5/2018 | Nitzan et al. |
| 10,045,766 B2 | 8/2018 | McNamara et al. |
| 10,076,403 B1 | 9/2018 | Eigler et al. |
| 10,098,551 B2 | 10/2018 | Doan et al. |
| 10,188,375 B2 | 1/2019 | McNamara et al. |
| 10,195,441 B2 | 2/2019 | Kaiser et al. |
| 10,207,087 B2 | 2/2019 | Keren |
| 10,251,740 B2 | 4/2019 | Eigler et al. |
| 10,292,690 B2 | 5/2019 | Celermajer et al. |
| 10,350,384 B2 | 7/2019 | Farnan et al. |
| 10,357,357 B2 | 7/2019 | Levi et al. |
| 10,368,981 B2 | 8/2019 | Nitzan et al. |
| 10,376,359 B2 | 8/2019 | Essinger et al. |
| 10,376,680 B2 | 8/2019 | McNamara et al. |
| 10,398,421 B2 | 9/2019 | Celermajer |
| 10,405,903 B1 | 9/2019 | Biesinger et al. |
| 10,413,284 B2 | 9/2019 | McNamara et al. |
| 10,413,286 B2 | 9/2019 | McNamara et al. |
| 10,463,477 B2 | 11/2019 | Forcucci et al. |
| 10,463,490 B2 | 11/2019 | Rottenberg et al. |
| 10,478,067 B2 | 11/2019 | Najafi |
| 10,478,594 B2 | 11/2019 | Yacoby et al. |
| 10,568,751 B2 | 2/2020 | McNamara |
| 10,588,611 B2 | 3/2020 | Magnin et al. |
| 10,595,999 B2 | 3/2020 | Vettukattil et al. |
| 10,610,210 B2 | 4/2020 | Finch et al. |
| 10,624,621 B2 | 4/2020 | Celermajer |
| 10,632,292 B2 | 4/2020 | Forcucci et al. |
| 10,639,459 B2 | 5/2020 | Nitzan et al. |
| 10,675,450 B2 | 6/2020 | Finch |
| 10,828,151 B2 | 11/2020 | Nitzan et al. |
| 10,835,394 B2 | 11/2020 | Nae et al. |
| 10,898,698 B1 | 1/2021 | Eigler et al. |
| 10,912,645 B2 | 2/2021 | Rottenberg et al. |
| 10,925,706 B2 | 2/2021 | Eigler et al. |
| 10,932,786 B2 | 3/2021 | McNamara et al. |
| 10,940,296 B2 | 3/2021 | Keren |
| 10,945,716 B2 | 3/2021 | Chen et al. |
| 11,135,410 B2 | 10/2021 | Finch et al. |
| 11,633,194 B2 | 4/2023 | Alexander et al. |
| 11,690,976 B2 | 7/2023 | Yacoby et al. |
| 11,813,386 B2 | 11/2023 | Nae et al. |
| 12,186,176 B2 | 1/2025 | Eigler et al. |
| 2002/0165606 A1 | 11/2002 | Wolf et al. |
| 2002/0169371 A1 | 11/2002 | Gilderdale |
| 2002/0169475 A1 | 11/2002 | Gainor et al. |
| 2002/0173742 A1 | 11/2002 | Keren et al. |
| 2002/0177891 A1 | 11/2002 | Miles et al. |
| 2003/0032967 A1 | 2/2003 | Park et al. |
| 2003/0120292 A1 | 6/2003 | Park et al. |
| 2003/0125798 A1 | 7/2003 | Martin |
| 2003/0127090 A1 | 7/2003 | Gifford et al. |
| 2003/0163190 A1 | 8/2003 | LaFont et al. |
| 2004/0016514 A1 | 1/2004 | Nien |
| 2004/0077988 A1 | 4/2004 | Tweden et al. |
| 2004/0088045 A1 | 5/2004 | Cox |
| 2004/0093075 A1 | 5/2004 | Kuehne |
| 2004/0143294 A1 | 7/2004 | Corcoran et al. |
| 2004/0147869 A1 | 7/2004 | Wolf et al. |
| 2004/0147939 A1 | 7/2004 | Rabkin et al. |
| 2004/0162514 A1 | 8/2004 | Alferness et al. |
| 2004/0162545 A1* | 8/2004 | Brown ............... A61F 9/00781 977/778 |
| 2004/0210190 A1 | 10/2004 | Kohler et al. |
| 2004/0215067 A1 | 10/2004 | Stiger et al. |
| 2004/0215323 A1 | 10/2004 | Stiger |
| 2005/0033351 A1 | 2/2005 | Newton |
| 2005/0055082 A1 | 3/2005 | Ben Muvhar et al. |
| 2005/0143758 A1 | 6/2005 | Abbott et al. |
| 2005/0148925 A1 | 7/2005 | Rottenberg et al. |
| 2005/0165344 A1 | 7/2005 | Dobak, III |
| 2005/0192627 A1 | 9/2005 | Whisenant et al. |
| 2006/0025857 A1 | 2/2006 | Bergheim et al. |
| 2006/0111660 A1 | 5/2006 | Wolf et al. |
| 2007/0010837 A1 | 1/2007 | Tanaka |
| 2007/0010852 A1 | 1/2007 | Blaeser et al. |
| 2007/0043435 A1 | 2/2007 | Seguin et al. |
| 2007/0123917 A1 | 5/2007 | Ortiz et al. |
| 2007/0142907 A1 | 6/2007 | Moaddeb et al. |
| 2007/0213813 A1 | 9/2007 | Von Segesser et al. |
| 2007/0282157 A1 | 12/2007 | Rottenberg et al. |
| 2008/0119891 A1 | 5/2008 | Miles et al. |
| 2008/0215131 A1 | 9/2008 | Magnuson et al. |
| 2009/0204019 A1* | 8/2009 | Ginggen ............ A61M 27/006 600/561 |
| 2009/0243956 A1 | 10/2009 | Keilman et al. |
| 2009/0276040 A1 | 11/2009 | Rowe et al. |
| 2010/0057192 A1 | 3/2010 | Celermajer |
| 2010/0256753 A1 | 10/2010 | McNamara et al. |
| 2010/0292629 A1* | 11/2010 | Dacey, Jr. ............ A61L 2/0011 607/2 |
| 2010/0298755 A1 | 11/2010 | McNamara et al. |
| 2011/0054515 A1 | 3/2011 | Bridgeman et al. |
| 2011/0218480 A1 | 9/2011 | Rottenberg et al. |
| 2011/0218481 A1 | 9/2011 | Rottenberg et al. |
| 2011/0257723 A1 | 10/2011 | McNamara |
| 2011/0295183 A1 | 12/2011 | Finch et al. |
| 2011/0306916 A1 | 12/2011 | Nitzan et al. |
| 2012/0130301 A1 | 5/2012 | McNamara et al. |
| 2012/0265296 A1 | 10/2012 | McNamara et al. |
| 2012/0290062 A1 | 11/2012 | McNamara et al. |
| 2013/0165967 A1 | 6/2013 | Amin et al. |
| 2013/0197607 A1 | 8/2013 | Wilder et al. |
| 2014/0128796 A1 | 5/2014 | Keren et al. |
| 2014/0155768 A1 | 6/2014 | Orion et al. |
| 2014/0163449 A1 | 6/2014 | Rottenberg et al. |
| 2014/0277054 A1 | 9/2014 | McNamara et al. |
| 2015/0034217 A1 | 2/2015 | Vad |
| 2015/0119796 A1 | 4/2015 | Finch |
| 2015/0141807 A1 | 5/2015 | Fetterly |
| 2015/0148731 A1 | 5/2015 | Mcnamara et al. |
| 2015/0230843 A1 | 8/2015 | Palmer et al. |
| 2015/0320424 A1 | 11/2015 | Gourlay |
| 2016/0151179 A1 | 6/2016 | Favier et al. |
| 2016/0220357 A1 | 8/2016 | Anand et al. |
| 2016/0374682 A1 | 12/2016 | Leonard et al. |
| 2017/0273790 A1 | 9/2017 | Vettukattil et al. |
| 2017/0340460 A1 | 11/2017 | Rosen et al. |
| 2018/0014828 A1 | 1/2018 | Fonte et al. |
| 2018/0110468 A1 | 4/2018 | Goldshtein et al. |
| 2018/0243071 A1 | 8/2018 | Eigler et al. |
| 2018/0256865 A1 | 9/2018 | Finch et al. |
| 2018/0280667 A1 | 10/2018 | Keren |
| 2019/0021861 A1 | 1/2019 | Finch |
| 2019/0070421 A1 | 3/2019 | Chen |
| 2019/0254814 A1 | 8/2019 | Nitzan et al. |
| 2019/0262118 A1 | 8/2019 | Eigler et al. |
| 2019/0269392 A1 | 9/2019 | Celermajer et al. |
| 2019/0328513 A1 | 10/2019 | Levi et al. |
| 2019/0336163 A1 | 11/2019 | McNamara et al. |
| 2019/0374254 A1 | 12/2019 | Arkvalos et al. |
| 2020/0060825 A1 | 2/2020 | Rottenberg et al. |
| 2020/0078196 A1 | 3/2020 | Rosen et al. |
| 2020/0078558 A1 | 3/2020 | Yacoby et al. |
| 2020/0085600 A1 | 3/2020 | Schwartz et al. |
| 2020/0188143 A1 | 6/2020 | McNamara |
| 2020/0197178 A1 | 6/2020 | Vecchio |
| 2020/0229977 A1 | 7/2020 | Mixter et al. |
| 2020/0229982 A1 | 7/2020 | Mixter et al. |
| 2020/0245991 A1 | 8/2020 | Celermajer |
| 2020/0261705 A1 | 8/2020 | Nitzan et al. |
| 2020/0268515 A1 | 8/2020 | Vettukattil et al. |
| 2020/0306435 A1 | 10/2020 | Vollmers et al. |

(56) References Cited

U.S. PATENT DOCUMENTS

| | | |
|---|---|---|
| 2020/0315599 A1 | 10/2020 | Nae et al. |
| 2020/0368505 A1 | 11/2020 | Nae et al. |
| 2020/0391016 A1 | 12/2020 | Passman et al. |
| 2021/0052378 A1 | 2/2021 | Nitzan et al. |
| 2021/0059527 A1 | 3/2021 | Najafi |
| 2021/0085935 A1 | 3/2021 | Fahey et al. |
| 2021/0100665 A1 | 4/2021 | Nae et al. |
| 2021/0121179 A1 | 4/2021 | Ben-david et al. |
| 2021/0153776 A1 | 5/2021 | Minar et al. |
| 2021/0177508 A1 | 6/2021 | Kellerman |
| 2021/0259732 A1 | 8/2021 | Dicicco et al. |
| 2021/0259829 A1 | 8/2021 | Quinn |
| 2021/0259839 A1 | 8/2021 | Cole et al. |
| 2021/0290214 A1 | 9/2021 | Cole et al. |
| 2021/0299425 A1 | 9/2021 | Kume et al. |
| 2021/0299430 A1 | 9/2021 | Ratz et al. |
| 2021/0361257 A1 | 11/2021 | Eimer et al. |
| 2021/0370032 A1 | 12/2021 | Fahey et al. |
| 2022/0142652 A1 | 5/2022 | Alexander et al. |
| 2022/0313426 A1 | 10/2022 | Gifford, III et al. |
| 2022/0347446 A1 | 11/2022 | Fahey et al. |
| 2023/0191093 A1 | 6/2023 | Nae et al. |
| 2024/0000404 A1 | 1/2024 | Robertson |
| 2024/0399123 A1 | 12/2024 | Valdez et al. |
| 2024/0416091 A1 | 12/2024 | Mahmoudi |

FOREIGN PATENT DOCUMENTS

| | | | |
|---|---|---|---|
| AU | 2011332324 | 6/2013 | |
| AU | 2012214279 | 8/2013 | |
| AU | 2018228451 | 9/2019 | |
| CA | 2785041 | 8/2011 | |
| CA | 2786575 | 8/2011 | |
| CA | 2818417 | 5/2012 | |
| CA | 2955389 | 1/2016 | |
| CA | 3054891 | 9/2018 | |
| CN | 101415452 | 4/2009 | |
| CN | 102458316 | 5/2012 | |
| CN | 102905626 | 1/2013 | |
| CN | 103458832 | 12/2013 | |
| CN | 105662653 | 6/2016 | |
| CN | 109646063 | 4/2019 | |
| CN | 109646063 A | 4/2019 | |
| CN | 110536657 | 12/2019 | |
| EP | 0326757 | 8/1989 | |
| EP | 1658818 | 5/2006 | |
| EP | 2097012 | 9/2009 | |
| EP | 2528646 | 12/2012 | |
| EP | 2642954 | 10/2013 | |
| EP | 2967867 | 1/2016 | |
| EP | 3087953 | 11/2016 | |
| EP | 3291773 | 3/2018 | |
| EP | 3329860 | 6/2018 | |
| EP | 1771132 | 3/2019 | |
| EP | 3539462 A1 * | 9/2019 | ............... A61F 2/82 |
| EP | 3579907 | 12/2019 | |
| EP | 3589238 | 1/2020 | |
| EP | 3624701 | 3/2020 | |
| EP | 2999412 | 5/2020 | |
| EP | 3705154 | 9/2020 | |
| EP | 3716877 | 10/2020 | |
| EP | 3740163 | 11/2020 | |
| EP | 3766431 | 1/2021 | |
| EP | 3834737 | 6/2021 | |
| EP | 3843618 | 7/2021 | |
| EP | 3871626 | 9/2021 | |
| EP | 3886761 | 10/2021 | |
| EP | 3893731 | 10/2021 | |
| EP | 3897369 | 10/2021 | |
| IL | 176973 | 12/2006 | |
| IL | 221127 | 9/2012 | |
| IL | 226374 | 7/2013 | |
| IL | 215975 | 11/2016 | |
| IL | 227756 | 6/2017 | |
| IL | 220201 | 8/2017 | |
| IL | 253648 | 9/2017 | |
| IL | 255379 | 12/2017 | |
| IL | 252395 | 4/2020 | |
| IN | 2011KN04472 | 7/2012 | |
| IN | 2012KN01275 | 2/2013 | |
| IN | 2013KN01954 | 11/2013 | |
| IN | 2013CN06525 | 8/2014 | |
| IN | 2012KN01988 | 8/2016 | |
| JP | 2007527742 | 10/2007 | |
| JP | 2010508093 | 3/2010 | |
| JP | 2013046784 | 3/2013 | |
| JP | 2014503246 | 2/2014 | |
| JP | 2014512869 | 5/2014 | |
| JP | 2020509812 | 4/2020 | |
| KR | 20010046155 | 6/2001 | |
| WO | WO2001030230 | 5/2001 | |
| WO | WO2001072367 | 10/2001 | |
| WO | WO2001095783 | 12/2001 | |
| WO | WO2005074367 | 8/2005 | |
| WO | WO2007083288 | 7/2007 | |
| WO | WO2008055301 | 5/2008 | |
| WO | WO2010128501 | 11/2010 | |
| WO | WO2010129089 | 11/2010 | |
| WO | WO2011093941 | 8/2011 | |
| WO | WO2011094521 | 8/2011 | |
| WO | WO2012071075 | 5/2012 | |
| WO | WO2012085913 | 6/2012 | |
| WO | WO2012109557 | 8/2012 | |
| WO | WO2013014539 | 1/2013 | |
| WO | WO2013096965 | 6/2013 | |
| WO | WO2014150106 | 9/2014 | |
| WO | WO2014188279 | 11/2014 | |
| WO | WO2016014821 | 1/2016 | |
| WO | WO2016038115 | 3/2016 | |
| WO | WO2016178171 | 11/2016 | |
| WO | WO2018158747 | 9/2018 | |
| WO | WO2019142152 | 7/2019 | |
| WO | WO2019179447 | 9/2019 | |
| WO | WO2019188917 | 10/2019 | |
| WO | WO2019189079 | 10/2019 | |
| WO | WO2019209420 | 10/2019 | |
| WO | WO2020094085 | 5/2020 | |
| WO | WO2020094087 | 5/2020 | |
| WO | WO2020094094 | 5/2020 | |
| WO | WO2020110048 | 6/2020 | |
| WO | WO2020123338 | 6/2020 | |
| WO | WO2020202046 | 10/2020 | |
| WO | WO2020215090 | 10/2020 | |
| WO | WO2020217194 | 10/2020 | |
| WO | WO2020219265 | 10/2020 | |
| WO | WO2020225698 | 11/2020 | |
| WO | WO2020225757 | 11/2020 | |
| WO | WO2020229636 | 11/2020 | |
| WO | WO2020234751 | 11/2020 | |
| WO | WO2020251700 | 12/2020 | |
| WO | WO2020259492 | 12/2020 | |
| WO | WO2021025905 | 2/2021 | |
| WO | WO2021026485 | 2/2021 | |
| WO | WO2021034573 | 2/2021 | |
| WO | WO2021046753 | 3/2021 | |
| WO | WO2021055264 | 3/2021 | |
| WO | WO2021065873 | 4/2021 | |
| WO | WO2021065874 | 4/2021 | |
| WO | WO2021065875 | 4/2021 | |
| WO | WO2021065912 | 4/2021 | |
| WO | WO2021086707 | 5/2021 | |
| WO | WO2021091566 | 5/2021 | |
| WO | WO2021096766 | 5/2021 | |
| WO | WO2021101707 | 5/2021 | |
| WO | WO2021113670 | 6/2021 | |
| WO | WO2021136252 | 7/2021 | |
| WO | WO2021136261 | 7/2021 | |
| WO | WO2021138041 | 7/2021 | |
| WO | WO2021146342 | 7/2021 | |
| WO | WO2021158559 | 8/2021 | |
| WO | WO2021162888 | 8/2021 | |
| WO | WO2021178636 | 9/2021 | |
| WO | WO2021190547 | 9/2021 | |
| WO | WO2021212011 | 10/2021 | |

(56) References Cited

FOREIGN PATENT DOCUMENTS

| WO | WO2021224736 | 11/2021 |
| WO | WO2022093918 | 5/2022 |
| WO | WO2024249425 | 12/2024 |

OTHER PUBLICATIONS

Lehner et al., "The Creation of an Interatrial Right-To-Left Shunt in Patients with Severe, Irreversible Pulmonary Hypertension: Rationale, Devices, Outcomes," Current Cardiology Reports (2019) 21: 31, https://doi.org/10.1007/s11886-019-1118-8; 9 pages.

International Search Report and Written Opinion received for International Application No. PCT/US19/69106 filed Dec. 31, 2019; Applicant: Shifamed Holdings, LLC; Date of Mailing: Mar. 23, 2020; 10 pages.

International Search Report and Written Opinion received for International Application No. PCT/US21/28787, filed Apr. 23, 2021; Applicant: Shifamed Holdings, LLC; Date of Mailing: Aug. 10, 2021; 17 pages.

Ando et al., "Left ventricular decompression through a patent foramen ovale in a patient with hypertrophic cardiomyopathy: a case report," Cardiovascular Ultrasound volume, Article No. 2 (2004).

Braunwald, Heart Disease, Chapter 6, 2015, p. 186.

Bridges et al., "The Society of Thoracic Surgeons practice guideline series: transmyocardial laser revascularization," The Annals of Thoracic Surgery, vol. 77, Issue 4, Apr. 2004, pp. 1494-1502.

Bristow et al., "Improvement in cardiac myocyte function by biological effects of medical therapy: A new concept in the treatment of heart failure," European Heart Journal, vol. 16, Issue suppl. F, Jul. 1995, pp. 20-31.

Case et al., "Relief of High Left-Atrial Pressure in Left-Ventricular Failure," Lancet, Oct. 17, 1964, pp. 841-842.

Coats et al., "Controlled trial of physical training in chronic heart failure. Exercise performance, hemodynamics, ventilation, and autonomic function," Circulation, 1992;85:2119-2131.

Davies et al., "Reduced contraction and altered frequency response of isolated ventricular myocytes from patients with heart failure," Circulation, (1995), 92:2540-2549, Circulation, (1995), 92:2540-2549.

Ennezat et al., "An unusual case of low-flow, low gradient severe aortic stenosis: Left-to-right shunt due to atrial septal defect," Cardiology, (2009), 113(2):146-148.

Ewert et al., "Masked Left Ventricular Restriction in Elderly Patients With Atrial Septal Defects: A Contraindication for Closure," Catheterization and Cardiovascular Interventions, 52: 177-180, 2001.

Ewert et al., "Acute left heart failure after interventional occlusion of an atrial septal defect," Z. Kardiol., Catheterization and Cardiovascular Interventions, Z. Kardiol., (May 2001), 90(5):362-366.

Geiran et al., "Changes in cardiac dynamics by opening an interventricular shunt in dogs," J. Surg. Res., (Jan. 1990), 48(1):6-12.

Gelernter-Yaniv et al., "Transcatheter closure of left-to-right interatrial shunts to resolve hypoxemia," Congenit. Heart Dis., (Jan. 2008), 31(1):47-53.

Gewillig et al., "Creation with a stent of an unrestrictive lasting atrial communication," Cardio. Young, (2002), 12(4):404-407.

Khositseth et al., "Transcatheter Amplatzer Device Closure of Atrial Septal Defect and Patent Foramen Ovale in Patients With Presumed Paradoxical Embolism," Mayo Clinic Proc., 79:35-41 (2004).

Kramer et al., "Controlled study of captopril in chronic heart failure: A rest and exercise hemodynamic study," Circulation, (1983), 67(4):807-816.

Lai et al., "Bidirectional shunt through a residual atrial septal defect after percutaneous transvenous mitral commissurotomy," Cardiology, (1993), 83(3):205-207.

Lemmer et al., "Surgical implications of atrial septal defect complicating aortic balloon valvuloplasty," Ann. thorac. Surg., (Aug. 1989), 48(2):295-297.

Park et al., "Blade atrial septostomy: collaborative study," Circulation, 66(2):258-266 (1982).

Roven et al., "Effect of Compromising Right Ventricular Function in Left Ventricular Failure by Means of Interatrial and Other Shunts," American Journal Cardiology, 24:209-219 (1969).

Salehian et al., "Improvements in Cardiac Form and Function After Transcatheter Closure of Secundum Atrial Septal Defects," Journal of the American College of Cardiology, 45(4):499-504 (2005).

Schmitto et al., "Chronic heart failure induced by multiple sequential coronary microembolization in sheep," The International Journal of Artificial Organs, 31(4):348-353 (2008).

Schubert et al., "Left ventricular conditioning in the elderly patient to prevent congestive heart failure after transcatheter closure of the atrial septal defect," Catheter Cardiovasc. Interv., (2005), 64(3):333-337.

Stormer et al., "Comparative study of in vitro flow characteristics between a human aortic valve and a designed aortic and six corresponding types of prosthetic heart valves," European Surgical Research, (1976), 8(2):117-131.

Stumper et al., "Modified technique of stent fenestration of the atrial septum, Heart," (2003), 89:1227-1230.

Trainor et al., "Comparative Pathology of an Implantable Left Atrial Pressure Sensor," ASAIO Journal, Clinical Cardiovascular/Cardiopulmonary Bypass, 59(5):486-92 (2013).

Zhou et al., "Unidirectional valve patch for repair of cardiac septal defects with pulmonary hypertension," Annals of Thoracic Surgeons, 60: 1245-1249, 1995.

Extended European Search Report received for Application No. 21791938.0, Applicant: Shifamed Holdings, LLC; Date of Mailing: Apr. 3, 2024; 6 pages.

\* cited by examiner

SYSTEMS AND METHODS FOR ELECTRICAL MONITORING OF IMPLANTABLE DEVICES

CROSS-REFERENCE TO RELATED APPLICATION(S)

This application is a 35 U.S.C. § 371 U.S. National Phase application of International Patent Application No. PCT/US2021/056794, filed Oct. 27, 2021, which claims the benefit of U.S. Provisional Application No. 63/106,743, filed Oct. 28, 2020, each of which is incorporated by reference herein in its entirety.

TECHNICAL FIELD

The present technology generally relates to implantable medical devices and, in various aspects, to systems and methods for monitoring implantable devices for selectively controlling fluid flow between a first body region and a second body region.

BACKGROUND

Implantable shunting systems can be used to create and/or control fluid flow between different parts of a patient's body. For example, interatrial shunts may be used to treat heart failure (HF) patients with elevated left atrial pressure, e.g., by decompressing the left atrium (LA) by relieving pressure to the right atrium (RA) and systemic veins. However, conventional shunts generally have an annular passage with a fixed diameter which fails to account for a patient's changing physiology and condition. For this reason, conventional shunt devices may have a diminishing clinical effect after a period of time. Many conventional shunt devices typically are also only available in a single size that may work well for one patient but not another. Also, sometimes the amount of shunting created during the initial procedure is later determined to be less than optimal months after implantation. Moreover, under conventional approaches, the clinician may not be able to assess the state of the implanted shunt without invasive procedures. Accordingly, there is a need for improved devices, systems, and methods for shunting fluid within a patient's body.

DETAILED DESCRIPTION

Figure 1:
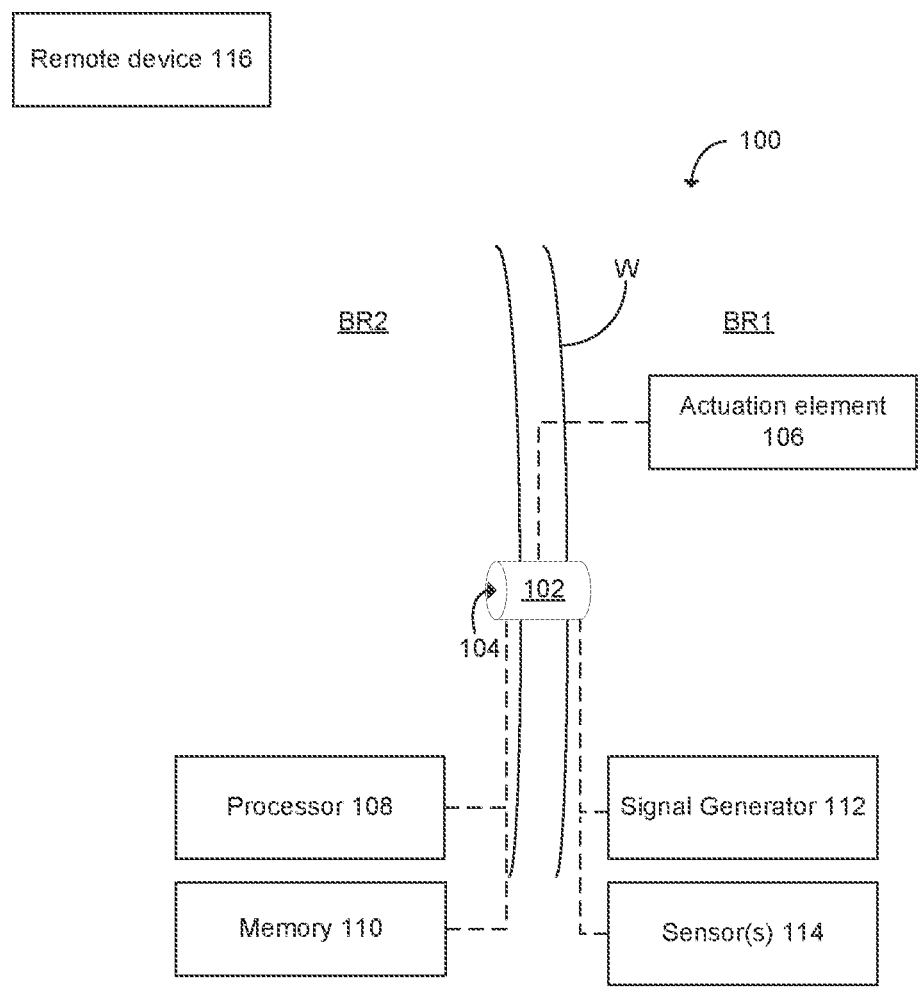
FIG. 1 is a schematic illustration of a shunting system configured in accordance with an embodiment of the present technology.

The present technology is generally directed to methods for monitoring implantable devices, such as shunting systems. A method in accordance with an embodiment of the present technology can be used, for example, to monitor a shunting element implanted in a patient and having a lumen fluidly coupling a first body region and a second body region of the patient. The geometry (e.g., size and/or shape) of the lumen can be selectively adjustable (e.g., non-invasively adjustable) to control the amount of fluid flow therethrough. The method can include applying an electrical input (e.g., a voltage waveform) to a first contact region and a second contact region of the shunting element. The first contact region can be spaced apart from the second contact region. The method can also include measuring an electrical output (e.g., a current waveform) that results from the electrical input. The method can further include calculating, via a processor, an electrical parameter (e.g., a capacitance value, inductance value, resistance value, waveguide cutoff frequency, resonant frequency) associated with the shunting element based, at least in part, on the electrical output. The electrical parameter can vary based on a size of the lumen (e.g., a lumen diameter) of the shunting element. The method can determine, via the processor, the size of a portion of the lumen based, at least in part, on the electrical parameter. In some embodiments, the method can be repeated one or more times to see how the lumen geometry changes. It will also be appreciated that, in addition to assessing lumen geometry, the electrical parameter may be used to assess shunt function and/or one or more physiological factors of the patient associated with operation of the shunting element. The present technology is expected to improve treatment efficacy by allowing the clinician to accurately and quickly monitor the geometry (size, shape, etc.) of the shunt lumen, determine whether lumen adjustments would be beneficial, and/or confirm whether lumen adjustments were successful.

The terminology used in the description presented below is intended to be interpreted in its broadest reasonable manner, even though it is being used in conjunction with a detailed description of certain specific embodiments of the present technology. Certain terms may even be emphasized below; however, any terminology intended to be interpreted in any restricted manner will be overtly and specifically defined as such in this Detailed Description section. Additionally, the present technology can include other embodiments that are within the scope of the examples but are not described in detail with respect to FIGS. 1-7.

Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

Reference throughout this specification to relative terms such as, for example, "generally," "approximately," and "about" are used herein to mean the stated value plus or minus 10%.

As used herein, the terms "interatrial device," "interatrial shunt device," "IAD," "IASD," "interatrial shunt," and "shunt" are used interchangeably to refer to a device that, in at least one configuration, includes a shunting element that provides a fluid flow (e.g., blood flow) between a first region (e.g., a LA of a heart) and a second region (e.g., a RA or coronary sinus of the heart) of a patient. Although certain embodiments herein are described in terms of a shunt between the atria, namely the left and right atria, one will appreciate that the technology may be applied equally to devices positioned between other chambers and passages of the heart, between other parts of the cardiovascular system, or other parts of a patient's body. For example, any of the shunts described herein, including those referred to as "interatrial," may be nevertheless used and/or modified to shunt between the LA and the coronary sinus, between the right pulmonary vein and the superior vena cava, or between other body regions. Moreover, while the disclosure herein primarily describes shunting blood from the LA to the RA, the present technology can be readily adapted to shunt blood from the RA to the LA to treat certain conditions, such as pulmonary hypertension. For example, mirror images of embodiments, or in some cases identical embodiments, used to shunt blood from the LA to the RA can be used to shunt blood from the RA to the LA in certain patients.

The headings provided herein are for convenience only and do not interpret the scope or meaning of the claimed present technology.

A. Select Embodiments of Methods for Monitoring Shunting Systems

FIG. 1 is a schematic illustration of a shunting system 100 ("system 100") configured in accordance with an embodiment of the present technology. The system 100 includes a shunting element 102 defining a lumen 104 therethrough. When implanted in a tissue wall W (e.g., the septal wall), the system 100 can fluidly connect a first body region BR1 (e.g., the LA) and a second body region BR2 (e.g., the RA) via the lumen 104. The shunting element 102 can include additional features not shown in FIG. 1, such as a frame, anchors, membrane, or the like. The shunting element 102 can be made partially or entirely from electrically conductive materials (e.g., metal) such that the shunting element 102 exhibits measurable electrical properties, as discussed further below.

The system 100 can also include an actuation element 106 configured to change a size, shape, and/or other characteristic of the shunting element 102 to selectively modulate the flow of fluid through the lumen 104. For example, the actuation element 106 can be configured to selectively increase a diameter (e.g., an orifice diameter, hydraulic diameter, etc.) of the lumen 104 and/or selectively decrease a diameter of the lumen 104 in response to an input. In other embodiments, the actuation element 106 is configured to otherwise affect a shape and/or geometry of the lumen 104. Accordingly, the actuation element 106 can be coupled to the shunting element 102 and/or can be included within the shunting element 102. In some embodiments, for example, the actuation element 106 is part of the shunting element 102 and at least partially defines the lumen 104. In other embodiments, the actuation element 106 is spaced apart from but operably coupled to the shunting element 102. The changes in the geometry of the lumen 104 can affect the electromagnetic parameters of the shunting element 102 (e.g., inductance, resistance, capacitance, waveguide characteristics, resonant characteristics), as discussed in greater detail below.

In some embodiments, at least a portion of the actuation element 106 comprises a shape memory material, such as a shape memory metal or alloy (e.g., nitinol), a shape memory polymer, or a pH-based shape memory material. In embodiments in which the actuation element 106 is composed of a shape memory material (referred to herein as a "shape memory actuation element"), the shape memory actuation element can be configured to change in geometry (e.g., transform between a first configuration and a second configuration) in response to a stimulus (e.g., heat or mechanical loading). For example, in some embodiments the shape memory actuation element is deformed relative to its preferred geometry (e.g., manufactured geometry, original geometry, heat set geometry, etc.) when it is in a first relatively malleably or plastic material state (e.g., martensitic material state or R-phase material state). When the deformed shape memory element is heated above its transition temperature (which in some embodiments is a temperature greater than body temperature), the shape memory actuation element transitions to a second material state (e.g., R-phase material state or austenitic material state), which causes the shape memory actuation element to move toward its preferred geometry. The movement of the actuation element from the deformed position toward its preferred geometry can adjust the geometry of the lumen 104, as described above. Additional aspects of adjusting a shunt using shape memory actuation elements, including various adjustable shunts incorporating shape memory actuation elements, are described in PCT Application No. PCT/US2020/049996, titled "ADJUSTABLE SHUNTS AND ASSOCIATED SYSTEMS AND METHODS," the disclosure of which is incorporated by reference herein in its entirety.

The system 100 can also include a processor 108 (e.g., a microprocessor, microcontroller, FPGA, ASIC, etc.) configured to perform various operations in accordance with corresponding instructions stored in the memory 110. Alternatively or additionally, some or all of the processing can be accomplished by use of at least one of a monolithic microwave integrated circuits (MMIC), surface acoustic wave (SAW) filter, tapped delay line, operational amplifier, active or passive, linear or non-linear, analog circuit, or other circuit or device capable of processing an electrical signal as known to one with skill in the art. In some embodiments, for example, the processor 108 is configured to monitor the size of at least a portion of the lumen 104, e.g., by applying electromagnetic signals (e.g., electrical signals, magnetic fields) to the shunting element 102 via a signal generator 112 and measuring an electromagnetic output resulting from the applied signals, as discussed in greater detail below. Alternatively or in combination, the processor 108 can determine lumen size based on data from one or more sensors 114 (e.g., thermistors, time-of-flight sensors, or other electronic components) and/or other components carried by the shunting element 102, as described further below. The processor 108 can transmit the size data to a remote device 116 (e.g., a device external to the patient's body such as a controller, mobile device, reader, etc.) via wired or wireless communication techniques. Accordingly, the clinician can assess the size of the lumen 104 (e.g., at a current point, over a series of previous time points, etc.) without requiring medical imaging or performing a surgical operation or other invasive procedure.

Figure 2:
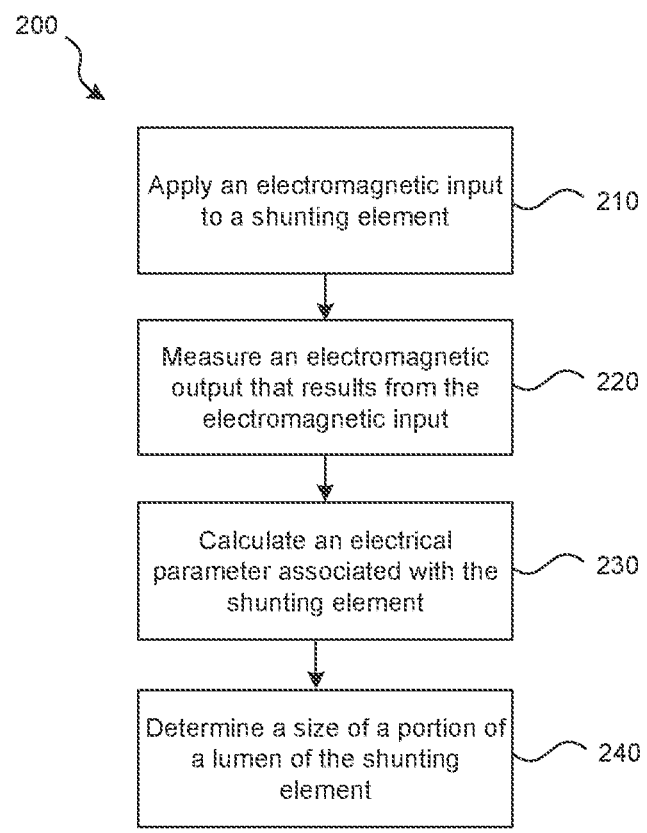
FIG. 2 is a block diagram illustrating a method for monitoring a shunting system configured in accordance with an embodiment of the present technology.

FIG. 2 is a block diagram illustrating a method 200 for monitoring a shunting system configured in accordance with an embodiment of the present technology. The method 200 can be performed by the system 100 described with respect to FIG. 1 or other suitable systems. In some embodiments, some or all of the steps of the method 200 are performed by a processor (e.g., processor 108 of FIG. 1) configured to execute instructions stored in a memory and/or a non-transitory computer-readable medium for performing the operations described herein. The processor can be implanted in the patient's body, or can be an external device that communicates with one or more implanted components. In other embodiments, however, the method 200 may be implemented by other suitable mechanisms, systems, or devices.

Beginning at block 210, the method 200 includes applying an electromagnetic input to a shunting element (e.g., shunting element 102 of FIG. 1). The electromagnetic input can be an electrical input signal, a magnetic field, or a suitable combination thereof, and can be applied by a signal generator (e.g., signal generator 112 of FIG. 1) or other suitable implanted component. For example, the electromagnetic input can be or include a voltage waveform (e.g., a sinusoidal and/or AC voltage waveform). The waveform can have a frequency in a range from 100 kHz to 24 GHz. In some embodiments, the frequency of the applied waveform is sufficiently high (e.g., at least 1 GHz, 5 GHz, or 10 GHz) so that the shunting element acts as a waveguide and/or resonator for the waveform, as described in greater detail below. As another example, the electromagnetic input can be or include a magnetic field (e.g., a magnetic field transverse to a direction of fluid flow through the lumen of the shunting element). In some embodiments, the electromagnetic input is or includes an electrical signal applied to one or more contact regions of the shunting element, such as a first contact region and a second contact region. The contact region(s) can be located on any suitable electrically conductive portion(s) of the shunting element, such as on a frame, struts, anchoring elements, actuation elements, etc. The first and second contact regions can be spaced apart from each other and/or located on different portions of the shunting element.

Figure 3A:
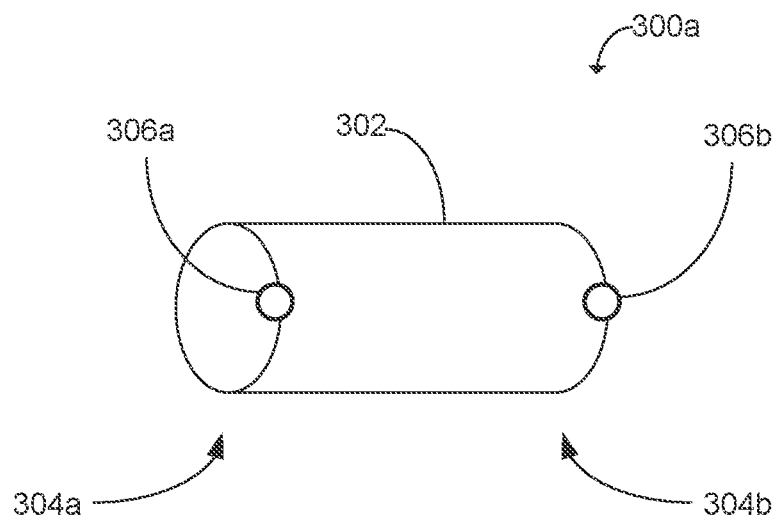
FIGS. 3A-3C are schematic illustrations of representative configurations for electrical contact regions on a shunting element in accordance with embodiments of the present technology.
Figure 3B:
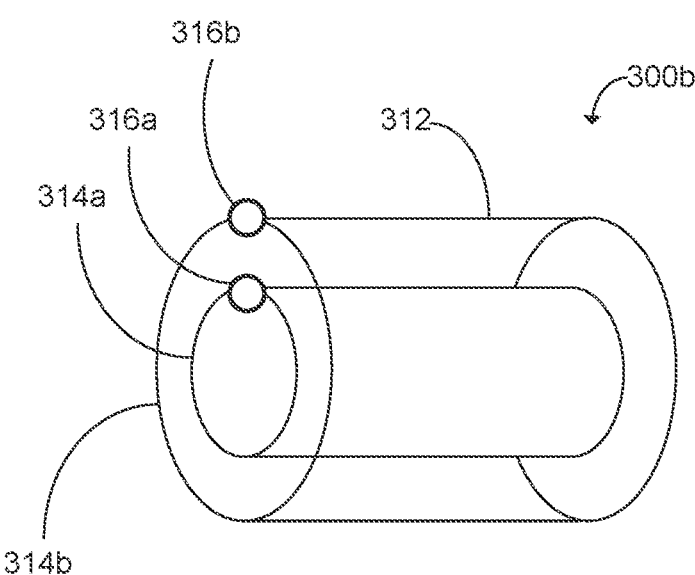

FIGS. 3A and 3B are schematic illustrations of representative shunting systems 300a-b including electrical contact regions on a shunting element in accordance with embodiments of the present technology. Referring first to FIG. 3A, the shunting system 300a ("system 300a") includes a shunting element 302 having a first end portion 304a and a second (e.g., opposite) end portion 304b. The system 300a includes a first contact region 306a at or near the first end portion 304a, and a second contact region 306b at or near the second end portion 304b. For example, the first contact region 306a can be located on a first anchoring element, frame, strut, etc. (not shown) at or near the first end portion 304a, and the second contact region 306b can located on a second anchoring element, frame, strut, etc. (not shown) at or near the second end portion 304b. In other embodiments, however, one or both of the first contact regions 306a-b can be spaced apart and/or offset from the first and second end portions 304a-b, respectively. Additionally, although FIG. 3A shows the first and second contact regions 306a-b as being on the same lateral side of the shunting element 302, in other embodiments, the first and second contact regions 306a-b can be on different lateral slides. In some embodiments, system 300a is used when calculating an inductance value and/or resistance value for the shunting element 302, as discussed in further detail below. In still other embodiments, the first and second contact regions 306a-b can be on the same end portion of shunting element 302 (e.g., both located at first end portion 304a or both located at second end portion 304b), but spaced apart laterally from one another.

Referring next to FIG. 3B, the shunting system 300b ("system 300b") includes a shunting element 312 having a first (e.g., interior) frame structure 314a ("first frame 314a") and a second (e.g., exterior) frame structure 314b ("second frame 314b"). In the illustrated embodiment, the second frame 314a partially or entirely surrounds the first frame 314b. The system 300b includes a first contact region 316a at or near the first frame 314a, and a second contact region 316b at or near the second frame 314b. In some embodiments, for example, the first and second frames 314a-b each include or more struts (e.g., longitudinal and/or radial struts—not shown) and the first and second contact regions 316a-b are located on the struts. The first and second contact regions 316a-b can be respectively positioned at any suitable portion of the first and second frames 314a-b. For example, FIG. 3B depicts the first and second contact regions 316a-b as being located on the end portions of the first and second frames 314a-b, respectively. In other embodiments, however, one or both of the first and second contact regions 316a-b can be spaced apart from the end portions, e.g., located at or near the central portions of the first and second frames 314a-b, respectively. Additionally, although FIG. 3B shows the first and second contact regions 316a-b as being at or near the same end portion of the shunting element 312, the first and second contact regions 316a-b can alternatively be located at different end portions of the shunting element 312. In some embodiments, the system 300b is used when calculating a capacitance value (e.g., between the first and second frames 314a-b), waveguide cutoff frequency, and/or resonant frequency for the shunting element 312, as discussed in further detail below.

Referring again to FIG. 2, at block 220, the method 200 continues with measuring an electromagnetic output that results from the electromagnetic input. The electromagnetic output can be or include an electrical output signal, a magnetic field, or a combination thereof. For example, the electromagnetic output can be or include a current waveform (e.g., a sinusoidal and/or AC waveform) resulting from a voltage input waveform. The current waveform can have both components in phase and 90 degrees out of phase (in quadrature) with the voltage waveform. The ratio of the in-phase and quadrature components of the current is equal to the ratio of the resistive and reactive components of the electrical impedance between the contact regions 306a and 306b, or 316a and 316b. In FIG. 3A, for example, the resistance R of the shunt 302 may be constant as the diameter changes, and the inductance L may vary so that their ratio, the L/R time constant will also vary. Referring to FIG. 3B, in a different example, the resistance R of the shunt 312 may be constant as the difference in diameters of frames 314a and 314b changes, and the capacitance C may vary, so that their product, the RC time constant, will also vary.

Figure 3C:
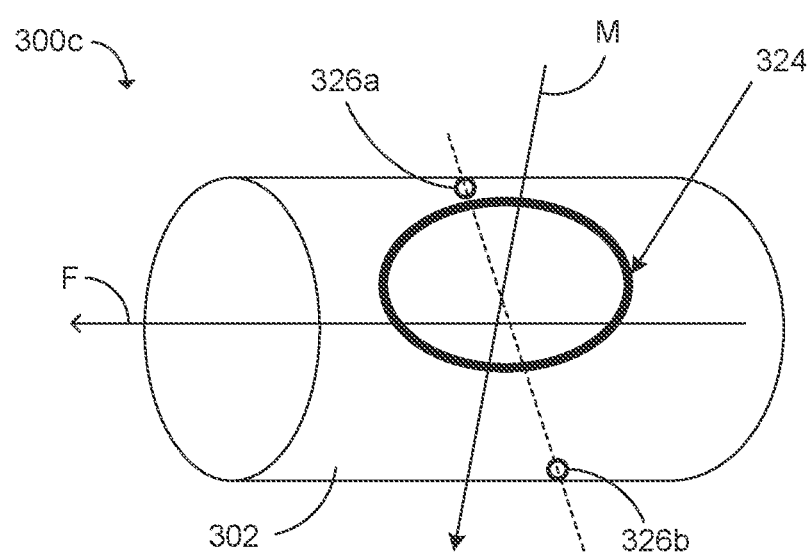

The current waveform can be measured at the same contact regions where the voltage input waveform was applied, or can be measured at different contact regions. As another example, the electromagnetic output can be or include a voltage output or waveform resulting from an applied magnetic field. FIG. 3C, for example, illustrates a shunting system 300c ("system 300c") in which a magnetic field can be produced by a current carrying coil 324 placed on or in proximity to an outer surface of the shunt 302, where the magnetic field direction (as shown by arrow M) is substantially perpendicular to the direction of fluid flow (as shown by the arrow F). In such embodiments, the voltage output or waveform can be measured at a first contact region 326a and a second contact region 326b spaced apart from the first contact region 326a. The first and second contact regions 326a and 326b are carried on or within a lumen of the shunting element 302. The first and second contact regions 326a and 326b can be located within the flow path along an axis mutually perpendicular to the direction of fluid flow F through the shunting element 302 and the applied magnetic field and may also be electrically insulated from the shunting element 302. In some embodiments, the measured flow value can additionally be used in combination with the measured pressures at an inlet and an outlet of the lumen of the shunt 302 to calculate a diameter of the lumen.

Referring back to FIG. 2, at block 230, the method 200 includes calculating at least one electrical parameter associated with the shunting element based, at least in part, on the measured electromagnetic output. The electrical parameter can be any parameter that varies based on the size of the lumen shunting element, and can include one or more of the following: a capacitance value, an inductance value, a resistance value, a waveguide cutoff frequency, or a resonant frequency. The electrical parameter can be determined from the electromagnetic output in many different ways. For example, in embodiments where the electromagnetic output is or includes a sinusoidal current waveform, the electrical parameter can be determined based on the magnitude, phase, and/or frequency content of the waveform, in accordance with techniques known to those of skill in the art.

At block 240, the method 200 proceeds with determining a size of at least a portion of a lumen of the shunting element based, at least partially, on the calculated electrical parameter. The lumen size (e.g., a diameter) can be determined in a number of different ways, and can be computed based on relationships between geometry and electrical parameters known to those of skill in the art. For example, the inductance L per unit length of a cylindrical conductor (e.g., shunting element 302 of FIG. 3A) can be related to the radius r of the cylindrical conductor using the following equations:

$$\delta = \frac{1}{\sqrt{\pi f \mu \sigma}}$$

$$L = \frac{1}{\sigma f (2\pi)^2 r} \left[ \left( \sinh\left(\frac{2d}{\delta}\right) - \sin\left(\frac{2d}{\delta}\right) \right) \Big/ \left( \cosh\left(\frac{2d}{\delta}\right) - \cos\left(\frac{2d}{\delta}\right) \right) \right]$$

where f is the frequency of the applied signal, δ is the skin depth in the cylinder at frequency f, σ is the electrical conductivity of the cylinder, d is the thickness of the cylinder wall, and μ is the magnetic permeability of the cylinder. As such, the radius r of the cylinder can be calculated from the measured value of the inductance L and the above equations. Optionally, the computation can be performed for various numerical values of L and r, and the results can be stored in a look-up table or other suitable data structure.

As another example, the equations relating the capacitance $C_l$ per unit length between a first conductive cylinder having a radius a (e.g., frame 314a of FIG. 3B) and a second conductive cylinder having a radius b (e.g., frame 314b of FIG. 3B), radius b being greater than radius a, are as follows:

$$C_l = \left(\frac{C}{l}\right) = \frac{2\pi\varepsilon}{\ln\left(\frac{b}{a}\right)}$$

which can be solved for a as follows:

$$a = b/e^{2\pi\varepsilon l/C}$$

where ε is the electrically permittivity of the blood in the lumen. Accordingly, the value of radius a can be calculated from the known length l measured capacitance C, and the above equations, if the value of radius b is known (e.g., constant). Similarly, the value of radius b can be calculated from the known length l measured capacitance C, and the above equations, if the value of radius a is known (e.g., constant). Alternatively or in addition, the ratio of radius b to radius a may be calculated from the measured capacitance C and the above equations even if the values of both radius a and radius b are unknown. Optionally, the computation can be performed for various numerical values of C, a, and b, and the results can be stored in a look-up table or other suitable data structure.

In a further example, the resistance R of a piece of material of length l and cross-sectional area A is given by:

$$R = \frac{\rho l}{A}$$

where ρ is the resistivity of the material. The above equation may be used to determine the change in lumen size in embodiments where the shunting element includes one or more shape memory components, such as one or more shape memory actuation elements for adjusting lumen size. For example, sensors and/or processors can use the measurements and the above equation to confirm during the actuation event whether a desired state change has been achieved. This indication, for example, could be used to identify that the intended size change, resulting from the kinematics of the shape memory actuator, may not have been achieved if the state change has not been changed.

Alternatively or in combination, the resistance equation provided above may be used in embodiments where the ratio of the length l and cross-sectional area A of the material of the shunt lumen itself changes when the lumen size is adjusted. For example, the lumen can be made of a relatively compliant material that deforms when force is applied by an actuation element or by another system component. The measured resistance R of the lumen material can be used to compute the deformation of the lumen material, which in turn can be correlated to the change in lumen size.

Optionally, the electrical parameters of the shunting element (e.g., inductance L, capacitance C, and/or resistance R) can be determined by using the shunting element (or a portion thereof) as a component in a circuit, such as a timing or oscillator circuit. The characteristics of the circuit (e.g., resonant frequency, time constant, pulse width, pulse frequency, etc.) can vary according to the electrical parameters of the shunting element. As such, the electrical parameters can be determined by measuring the circuit characteristics in accordance with techniques known to those of skill in the art. The electrical parameters can then be used to calculate the lumen size, e.g., using the equations discussed above.

In yet another example, the lumen size can be calculated from the cutoff frequency of the waveguide formed by the shunting element. The shunting element can function as a waveguide that propagates electromagnetic waves along the length of the shunting element. As is known to one skilled in the art, an electromagnetic wave of specified frequency f can be generated in the shunt by applying an electrical stimulus, e.g. a voltage or a current, at that frequency to one or more contact regions on the body of the shunt, or in the vicinity of the exit or entrance to the shunt (e.g. with an antenna), positioned so that the voltages and currents induced in the shunt are valid boundary conditions for a wave propagating within the lumen of the shunt. Without wishing to be bound by theory, in some embodiments, the shunting element only propagates waves above a certain frequency (e.g., a frequency corresponding to a wavelength approximately equal to the length of the shunting element), known as the waveguide cutoff frequency. The waveguide cutoff frequency can depend on the size (e.g., diameter) of the shunt lumen. The waveguide cutoff frequency can be determined by applying an electrical drive (e.g., voltage, current) having a plurality of frequencies to the shunting element and detecting when the electromagnetic output signal power increases. The wavelength of the lowest waveguide cutoff frequency for the TEii (transverse electric 1,1) mode for a cylinder of radius r is given by:

$$\lambda_c = \frac{2\pi r}{1.84}$$

which can be solved for shunt diameter d=2r by:

$$d = \lambda_c \times \frac{1.84}{\pi}$$

Wavelength can be calculated based on the applied frequency f (e.g., by a lookup, piecewise-linear approximation, or other calculation performed by the processor). Tabulations of wavelength in blood as a function of frequency are well-known to those skilled in the art (see, e.g., http://niremlifac.cnr.it/tissprop/htmlclie/htmlclie.php).

As yet another example, the lumen size can be calculated from the resonant frequency of the shunting element. The resonant frequency of an open cylinder filled with a medium of known permittivity (e.g., blood) can be related to its geometric parameters (e.g., radius, length) by Maxwell's equations in accordance with techniques known to those of skill in the art. In some embodiments, the resonant frequency of the shunting element is determined by applying an electrical stimulus (e.g., a voltage or a current) to one or more contact regions on the body of the shunt or in the vicinity of the exit or entrance to the shunt (e.g., with an antenna) having a plurality of different frequencies to the shunting element (e.g., via the first and second contact regions 306a-b of the system 300a of FIG. 3A), and detecting when the amount of power consumption of the applied waves decreases (i.e., resonance). For example, the resonant frequencies of a shunting element filled with blood may be within a range from 1 GHz to 15 GHz. Subsequently, the resonant frequency can be used to compute the radius of the shunt lumen.

In some embodiments, some or all of the steps of the method 200 are performed before, during, and/or after a shunt adjustment operation. For example, a clinician can use the techniques described herein to non-invasively determine the lumen geometry of an implanted shunting element before making any adjustments to the shunting element, e.g., to assess the current state of the shunting element, determine whether the shunting element was implanted properly, evaluate whether adjustments would be beneficial, etc. The techniques herein can also be to provide guidance during an invasive or non-invasive shunt adjustment procedure. Optionally, the techniques herein can also be used to measure the lumen geometry after the adjustment procedure has been completed, e.g., to confirm whether the intended adjustments were successfully achieved, assess whether additional adjustments would be beneficial, etc.

FIGS. 4A-6B and the accompanying description provide additional embodiments of systems and methods for monitoring a shunting element that may be used in combination with, or as an alternative to, the embodiments discussed above with respect to FIGS. 1-3B. For example, any of the features of the system 100 of FIG. 1 may be incorporated in the embodiments described with respect to FIGS. 4A-6B below. Additionally, the process steps described with reference to the method 200 of FIG. 2 can also be applied to the embodiments of FIGS. 4A-6B below.

Figure 4A:
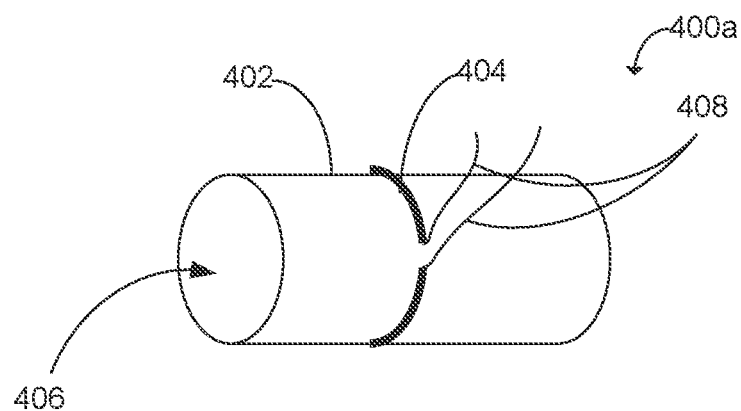
FIG. 4A-4C are schematic illustrations of shunting systems including conductive elastomers configured in accordance with embodiments of the present technology.
Figure 4B:
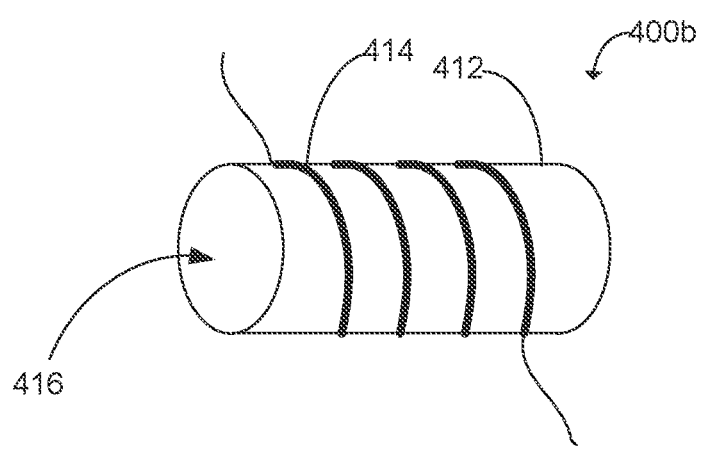
Figure 4C:
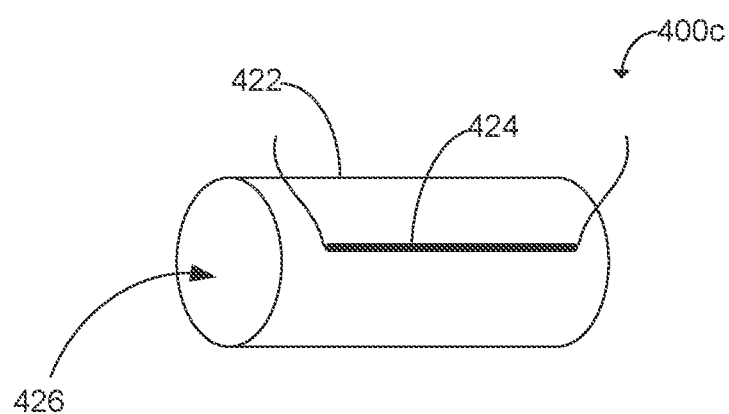

FIG. 4A-4C are schematic illustrations of shunting systems 400a-c including conductive elastomers configured in accordance with embodiments of the present technology. Referring first to FIG. 4A, the shunting system 400a ("system 400a") includes a shunting element 402 carrying a conductive elastomer 404. The conductive elastomer 404 can be made of any suitable low-modulus material, such as a silicone rubber loaded with a suitable conductive material, such as carbon. The conductive elastomer 404 can have a resistance value that varies according to the geometry of the conductive elastomer 404 (e.g., length, cross-sectional area, etc.). In the embodiment of FIG. 4A, the conductive elastomer 404 is disposed circumferentially around at least a portion of the shunting element 402, such that the geometry (e.g., length) of the conductive elastomer 404 changes as the diameter of the lumen 406 of the shunting element 402 increases or decreases. Accordingly, the diameter of the shunting element 402 can be determined by measuring the resistance value of the conductive elastomer 404. In some embodiments, the resistance measurements are made by a processor (not shown) or other suitable device operably coupled to the conductive elastomer 404. For example, the resistance of the conductive elastomer 404 can be determining by applying a voltage to the conductive elastomer 404 (e.g., via wires 408) and measuring the resulting current through the conductive elastomer 404.

Referring next to FIG. 4B, the shunting system 400b ("system 400b") includes a shunting element 412 and a conductive elastomer 414 wrapped helically around the shunting element 412. The resistance value of the conductive elastomer 414 can vary based on the coil size of the conductive elastomer 414, and the coil size can change as the diameter of the lumen 416 of the shunting element 412 increases or decreases. Accordingly, the diameter of the shunting element 412 can be determined by measuring the resistance value of the conductive elastomer 414, e.g., as previously described with respect to FIG. 4A.

Referring next to FIG. 4C, the shunting system 400c ("system 400c") includes a shunting element 422 and a conductive elastomer 424 disposed longitudinally along the length of the shunting element 422. The resistance value of the conductive elastomer 424 can vary based on the length of the conductive elastomer 424, and the length of the conductive elastomer 424 can vary with the length of the shunting element 422. The configuration shown in FIG. 4C can be used in embodiments where the length of the shunting element 422 is correlated to the diameter of the lumen 426 of the shunting element 422, e.g., the length of the shunting element 422 increases as the diameter decreases and/or the length of the shunting element 422 decreases as the diameter increases. Thus, the diameter of the shunting element 422 can be determined by measuring the resistance value of the conductive elastomer 424, e.g., as previously described with respect to FIG. 4A.

Figure 5:
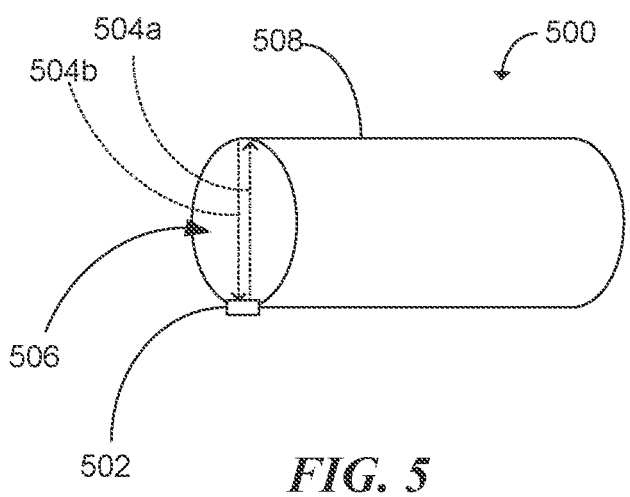
FIG. 5 is a schematic illustration of a shunting system including a time-of-flight sensor in accordance with an embodiment of the present technology.

FIG. 5 is a schematic illustration of a shunting system 500 ("system 500") including a time-of-flight (ToF) sensor 502 configured in accordance with an embodiment of the present technology. The ToF sensor 502 can be configured to emit a ToF signal 504a (e.g., an ultrasonic, radiofrequency, or optical signal) across a segment (e.g., a diameter) of a lumen 506 of the shunting element 508. In some embodiments, the emitted signal has a known/constant propagation velocity through the expected media (e.g., blood). The ToF sensor 502 an also be configured to receive signals similar to those that it emits. In one example, the ToF sensor 502 can be an optical ToF sensor configured to emit optical signals at a frequency having relatively low absorption in body fluids (e.g., blood), such as a frequency of approximately 680 nm or 850 nm. In the illustrated embodiment, the ToF sensor 502 is positioned at or near one side of the lumen 506, and emits a ToF signal 504a toward the opposite side of the lumen 506, which can reflect a portion of the emitted signal. The reflected ToF signal 504b from the opposite side of the lumen 506 can return to the ToF sensor 502. The size of the lumen 506 along the transmission path can be calculated (e.g., by a processor (not shown) that is part of the system) based on the total time of flight and the signal propagation velocity in accordance with techniques known to those of skill in the art. In some embodiments, the side of the lumen 506 opposite the ToF sensor 502 can include a reflective surface or be otherwise modified to improve the strength and/or directionality of a reflected signal that is redirected to the ToF sensor 502. In other embodiments, one or more additional ToF sensors (not shown) can be implemented along with ToF sensor 502. For example, one ToF sensor can be configured as an emitter, and a second, opposing ToF sensor can be configured as a receiver. The distance between the first and second ToF sensors can be calculated using the time of flight between emission and detection of the signal.

Figure 6A:
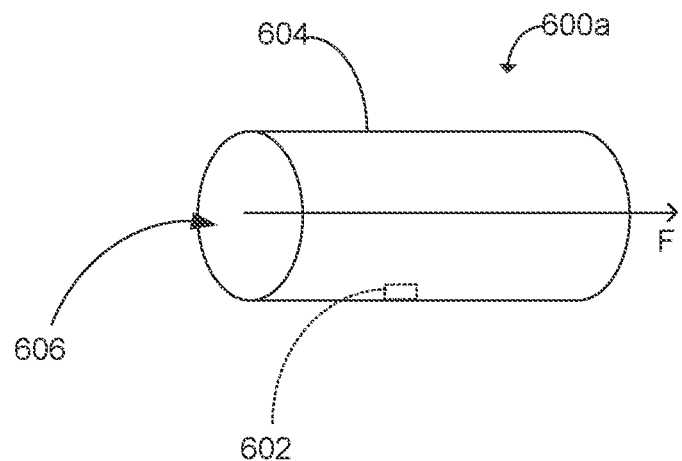
FIGS. 6A and 6B are schematic illustrations of shunting systems including temperature sensors configured in accordance with embodiments of the present technology.

FIG. 6A is a schematic illustration of a shunting system 600a ("system 600a") including a temperature sensor 602 configured in accordance with an embodiment of the present technology. In the illustrated embodiment, the temperature sensor 602 is positioned within a shunting element 604, such that fluid (e.g., blood) flowing through the lumen 606 of the shunting element 604 (e.g., along a flow direction F) passes over and/or around the temperature sensor 602. The temperature sensor 602 can be configured to receive an electrical input and generate an electrical output indicative from which the fluid flow rate may be calculated, which in turn can be correlated to the size of the lumen 606, e.g., in combination with measurement of pressures at the inlet and outlet of the lumen. For example, the temperature sensor 602 can be a thermistor and the electrical input can be a voltage, V, and the output the current I controlled such that the ratio V/I (which equals the resistance of the thermistor) remains constant, and the product V*I (which equals the power dissipated by the thermistor to maintain the temperature of the thermistor at a specified value) can be used to calculate the flow. In this example, higher amounts of power correspond to higher flow rates, and lower amounts of power correspond to lower flow rates. In another example, the temperature sensor 602 can be a thermistor and the electrical input can be a current I and the output the voltage V, controlled such that the ratio V/I (which equals the resistance of the thermistor) remains constant, and the product V*I (which equals the power dissipated by the thermistor to maintain the temperature of the thermistor at a specified value) can be used to calculate the flow, e.g., higher amounts of power correspond to higher flow rates, and lower amounts of power correspond to lower flow rates. Accordingly, the system 600a can determine the fluid flow rate through the lumen 606 by measuring the self-heating power of the temperature sensor 602. The measured flow value can additionally be used in combination with the measured pressures at the inlet and outlet of the lumen to calculate the diameter of the lumen.

Figure 6B:
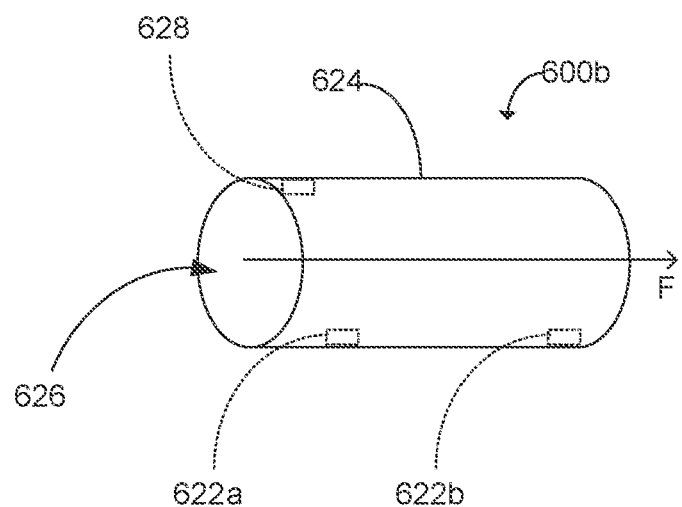

FIG. 6B is a schematic illustration of a shunting system 600b ("system 600b") including first and second temperature sensors 622a-b configured in accordance with embodiments of the present technology. The first and second temperature sensors 622a-b can be positioned at different locations within the shunting element 624 and can be spaced apart from each other. In the illustrated embodiment, for example, the first temperature sensor 622a is positioned upstream of the second temperature sensor 622b with respect to a flow direction F through the lumen 626 of the shunting element 624. The flow rate through the lumen 626 can be determined based on the temperature signals generated by the first and second temperature sensors 622a-b. In some embodiments, for example, the system 600b includes a heating element 628 that is positioned within the lumen 626, e.g., at a location closer to the first temperature sensor 622a than the second temperature sensor 622b. The heating element 628 can heat a portion of the shunting element 624 and/or the fluid flowing through the lumen 626 to create a temperature differential between the first temperature sensor 622a and the second temperature sensor 622b. The difference between the temperatures measurements from the first and second temperature sensors 622a-b can be used to calculate the flow rate through lumen 626, in accordance with techniques known to those of skill in the art. The measured flow value can additionally be used in combination with the measured pressures at the inlet and outlet of the lumen to calculate the diameter of the lumen.

B. Interatrial Shunts for Treatment of Heart Failure

In some embodiments, the systems and methods described herein (e.g., with respect to FIGS. 1-6B) are used for treating heart failure. Heart failure can be classified into one of at least two categories based upon the ejection fraction a patient experiences: (1) heart failure with reduced ejection fraction (HFpEF), historically referred to as diastolic heart failure or (2) heart failure with preserved ejection fraction (HFrEF), historically referred to as systolic heart failure. One definition of HFrEF is a left ventricular ejection fraction lower than 35%-40%. Though related, the underlying pathophysiology and the treatment regimens for each heart failure classification may vary considerably. For example, while there are established pharmaceutical therapies that can help treat the symptoms of HFrEF, and at times slow or reverse the progression of the disease, there are limited available pharmaceutical therapies for HFpEF with only questionable efficacy.

In heart failure patients, abnormal function in the left ventricle (LV) leads to pressure build-up in the LA. This leads directly to higher pressures in the pulmonary venous system, which feeds the LA. Elevated pulmonary venous pressures push fluid out of capillaries and into the lungs. This fluid build-up leads to pulmonary congestion and many of the symptoms of heart failure, including shortness of breath and signs of exertion with even mild physical activity. Risk factors for HF include renal dysfunction, hypertension, hyperlipidemia, diabetes, smoking, obesity, old age, and obstructive sleep apnea. HF patients can have increased stiffness of the LV which causes a decrease in left ventricular relaxation during diastole resulting in increased pressure and inadequate filling of the ventricle. HF patients may also have an increased risk for atrial fibrillation and pulmonary hypertension, and typically have other comorbidities that can complicate treatment options.

Figure 7:
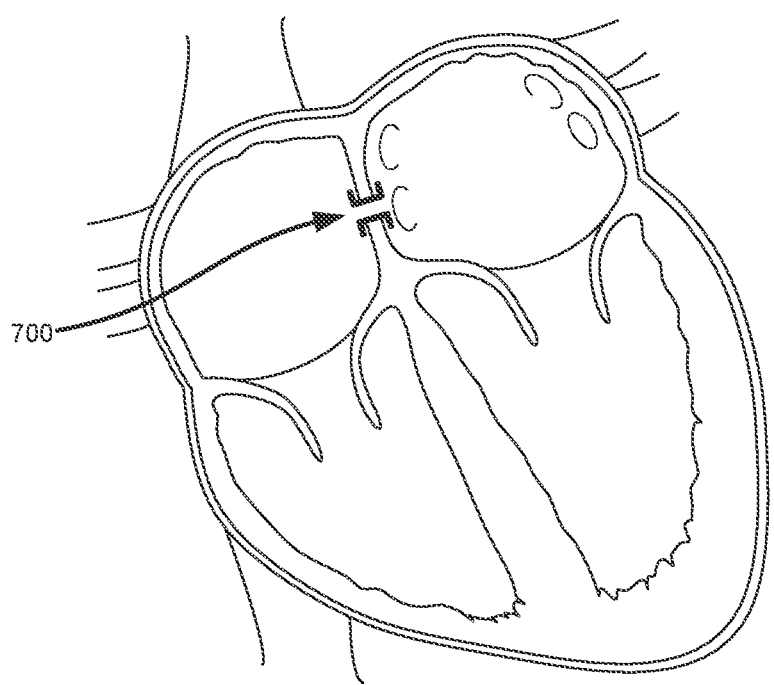
FIG. 7 is a schematic illustration of an interatrial device implanted in a heart and configured in accordance with an embodiment of the present technology.

Interatrial shunts have recently been proposed as a way to reduce elevated left atrial pressure, and this emerging class of cardiovascular therapeutic interventions has been demonstrated to have significant clinical promise. FIG. 7 shows the conventional placement of a shunt in the septal wall between the LA and RA. Most conventional interatrial shunts (e.g., shunt 700) involve creating a hole or inserting a structure with a lumen into the atrial septal wall, thereby creating a fluid communication pathway between the LA and the RA. As such, elevated left atrial pressure may be partially relieved by unloading the LA into the RA. In early clinical trials, this approach has been shown to improve symptoms of heart failure.

One challenge with many conventional interatrial shunts is determining the most appropriate size and shape of the shunt lumen. A lumen that is too small may not adequately unload the LA and relieve symptoms; a lumen that is too large may overload the RA and right heart more generally, creating new problems for the patient. Moreover, the relationship between pressure reduction and clinical outcomes and the degree of pressure reduction required for optimized outcomes is still not fully understood, in part because the pathophysiology for HFpEF (and to a lesser extent, HFrEF) is not completely understood. As such, clinicians are forced to take a best guess at selecting the appropriately sized shunt (based on limited clinical evidence) and generally cannot adjust the sizing over time. Worse, clinicians must select the size of the shunt based on general factors (e.g., the size of the patient's anatomical structures, the patient's hemodynamic measurements taken at one snapshot in time, etc.) and/or the design of available devices rather than the individual patient's health and anticipated response. With many such traditional devices, the clinician does not have the ability to adjust or titrate the therapy once the device is implanted, for example, in response to changing patient conditions such as progression of disease. By contrast, interatrial shunting systems configured in accordance with embodiments of the present technology allow a clinician to select shunt size—perioperatively or post-implant—based on the patient and, as discussed above with respect to FIGS. 1-6B, allow for non-invasive monitoring of lumen geometry to determine whether lumen adjustments would be beneficial and/or confirm whether lumen adjustments were successful.

As one of skill in the art will appreciate from the disclosure herein, various features of the methods and systems described above can be omitted without deviating from the scope of the present technology. Likewise, additional features not explicitly described above may be added to the methods and systems without deviating from the scope of the present technology. Accordingly, the methods and systems described herein are not limited to those configurations expressly identified, but rather encompasses variations and alterations of the described methods and systems. Moreover, the following paragraphs provide additional description of various aspects of the present technology. One skilled in the art will appreciate that the following aspects can be incorporated into any of the methods and systems described above.

Examples

Several aspects of the present technology are set forth in the following examples:

1. A method for monitoring a shunting element implanted in a patient and having a lumen fluidly coupling a first body region and a second body region of the patient, the method comprising:
  applying an electrical input to a first contact region and a second contact region of the shunting element, wherein the first contact region is spaced apart from the second contact region;
  measuring an electrical output that results from the electrical input;
  calculating, via a processor, an electrical parameter associated with the shunting element based, at least in part, on the electrical output, wherein the electrical parameter varies based on a size of the lumen of the shunting element; and
  determining, via the processor, the size of a portion of the lumen based, at least in part, on the electrical parameter.

2. The method of example 1 wherein the electrical input comprises a voltage waveform and the electrical output comprises a resulting current waveform.

3. The method of example 2 wherein the voltage waveform is a first sinusoidal waveform and the resulting current waveform is a second sinusoidal waveform.

4. The method of example 3 wherein the electrical output comprises a magnitude and a phase of the sinusoidal waveform.

5. The method of any one of examples 1-4 wherein the electrical parameter comprises one or more of: a capacitance value, an inductance value, a resistance value, a waveguide cutoff frequency, or a resonant frequency.

6. The method of any one of examples 1-5 wherein:
  the shunting element comprises an interior frame structure defining the lumen and an exterior frame structure at least partially surrounding the interior frame structure,
  the first contact region is located on the interior frame structure, and
  the second contact region is located on the exterior frame structure.

7. The method of example 6 wherein the electrical parameter comprises a capacitance value between the interior and exterior frame structures.

8. The method of any one of examples 1-7 wherein:
  the lumen extends between a first portion and a second portion of the shunting element,
  the first contact region is located at the first portion, and
  the second contact region is located at the second portion.

9. The method of example 8 wherein the electrical parameter comprises an inductance value, a resistance value, a waveguide cutoff frequency, or a resonant frequency.

The method of any one of examples 1-9 wherein the shunting element includes at least one shape memory component, and wherein the first and second contact regions are on the shape memory component.

11. The method of example 10 wherein the electrical parameter comprises a resistance value of the shape memory component.

12. The method of any one of examples 1-11 wherein the electrical input is applied by a component implanted in the patient's body.

13. The method of any one of examples 1-12 wherein the processor is implanted in the patient's body.

14. The method of any one of examples 1-13, further comprising transmitting, via the processor, the size of the lumen to a device external to the patient's body.

15. The method of any one of examples 1-14, further comprising transmitting the electrical output to a receiver external to the patient, wherein the processor is carried by the receiver.

16. The method of any one of examples 1-15, further comprising displaying the determined lumen size on a display external to the patient.

17. A system for shunting fluid between a first body region and a second body region of a patient, the system comprising:
   a shunting element having a lumen extending therethrough and configured to fluidly couple the first and second body regions when the shunting element is implanted in the patient, the shunting element including a first contact region and a second contact region spaced apart from the first contact region;
   a signal generator electrically coupled to the first and second contact regions and configured to apply an input signal thereto;
   a processor operably coupled to the shunting element and the signal generator; and
   a memory storing instructions that, when executed by the processor, cause the system to perform operations comprising:
      measuring an output signal that results from the input signal applied by the signal generator;
      calculating an electrical parameter associated with the shunting element based at least in part on the output signal, wherein the electrical parameter varies based on a size of the lumen of the shunting element; and
      determining the size of a portion of the lumen based at least in part on the electrical parameter.

18. A system for shunting fluid between a first body region and a second body region of a patient, the system comprising:
   a shunting element having a lumen extending therethrough and configured to fluidly couple the first and second body regions when the shunting element is implanted in the patient;
   at least one electronic component carried by the shunting element and comprising a conductive elastomer or a time-of-flight sensor, wherein the at least one electronic component is configured to generate and/or receive a signal with one or more parameters which vary based on a size of the lumen;
   a processor operably coupled to the shunting element and the at least one electronic component; and
   a memory storing instructions that, when executed by the processor, cause the system to perform operations comprising:
      receiving the signal from the at least one electronic component; and
      determining the size of a portion of the lumen based, at least in part, on the signal.

19. The system of example 18 wherein:
   the at least one electronic component comprises the conductive elastomer;
   the signal comprises a resistance value of the conductive elastomer; and
   the operations comprise determining the size of the portion of the lumen based, at least in part, on the resistance value.

20. The system of example 19 wherein the conductive elastomer is disposed circumferentially or helically around the shunting element.

21. The system of any one of examples 18-20 wherein:
the at least one electronic component comprises the time-of-flight sensor;
the signal comprises a time-of-flight signal; and
the operations comprise determining the size of the portion of the lumen based, at least in part, on the time-of-flight signal.

22. The system of example 21 wherein the time-of-flight sensor is configured to emit an ultrasonic, radiofrequency, or optical signal across a segment of the lumen.

23. A system for shunting blood between a first body region and a second body region of a patient, the system comprising:
   a shunting element having a lumen extending therethrough and configured to fluidly couple the first and second body regions when the shunting element is implanted in the patient;
   at least one temperature sensor carried by the shunting element, wherein the at least one temperature sensor is configured to generate and/or receive a signal that varies based on a rate of fluid flow through the lumen;
   a processor operably coupled to the shunting element and the at least temperature sensor;
   a memory storing instructions that, when executed by the processor, cause the system to perform operations comprising:
      receiving the signal from the at least one temperature sensor, and
      determining the rate of fluid flow through the lumen based, at least in part, on the signal.

24. The system of example 23 wherein the at least one temperature sensor includes a thermistor.

25. The system of example 24 wherein:
the signal is an amount of power to maintain self-heating of the thermistor; and
the operations comprise determining the rate of fluid flow through the lumen based at least in part on the amount of power.

26. The system of any one of examples 23-25 wherein:
the at least one temperature sensor includes a first temperature sensor configured to generate a first temperature signal and a second temperature sensor configured to generate a second temperature signal;
the first temperature sensor is spaced apart from the second temperature sensor; and
the operations further comprise determining the rate of fluid flow through the lumen based, at least in part, on a difference between the first and second temperature signals.

27. The system of example 26, further comprising a heating element carried by the shunting element and configured to heat a portion thereof.

28. The system of example 26 wherein:
the lumen extends between a first end portion and a second end portion of the shunting element;
the first temperature sensor is located at the first end portion; and
the second temperature sensor is located at the second end portion.

29. A method for monitoring a shunting element implanted in a patient having a lumen fluidly coupling a first body region and a second body region of the patient, the method comprising:
   applying a magnetic field transverse to a direction of fluid flow through the lumen;
   measuring, via a processor, a voltage output between a first contact region and a second contact region of the shunting element, wherein the first contact region is spaced apart from the second contact region, and wherein the first and second contact regions are located along an axis mutually perpendicular to the fluid flow and the applied magnetic field; and determining, via the processor, volume or velocity of the flow through the shunt based, at least in part, on the measured voltage output between the first and second contact regions.

30. A method for monitoring an implantable device implanted in a patient, wherein the implantable device comprises a lumen fluidly coupling a first body region of the patient to a second body region of the patient, the method comprising:

applying an electrical input to an element or elements located on or adjacent to the lumen;

measuring an electrical output resulting from the electrical input;

calculating, via a processor, an electrical parameter associated with the implantable device based, at least in part, on the electrical output, wherein the electrical parameter varies based on a size of the lumen of the implantable device; and determining, via the processor, the size of a portion of the lumen based, at least in part, on the electrical parameter.

CONCLUSION

Embodiments of the present disclosure may include some or all of the following components: a battery, supercapacitor, or other suitable power source; a microcontroller, FPGA, ASIC, or other programmable component or system capable of storing and executing software and/or firmware that drives operation of an implant; memory such as RAM or ROM to store data and/or software/firmware associated with an implant and/or its operation; some or all of a MMIC, SAW filter, tapped delay line, operational amplifier, active or passive, linear or non-linear, analog circuit, or other circuit or device capable of processing an electrical signal, wireless communication hardware such as an antenna system configured to transmit via Bluetooth, WiFi, or other protocols and at other frequencies, as is known in the art; energy harvesting means, for example a coil or antenna which is capable of receiving and/or reading an externally-provided signal which may be used to power the device, charge a battery, initiate a reading from a sensor, or for other purposes. Embodiments may also include one or more sensors, such as pressure sensors, impedance sensors, accelerometers, force/strain sensors, temperature sensors, flow sensors, optical sensors, cameras, microphones or other acoustic sensors, ultrasonic sensors, ECG or other cardiac rhythm sensors, SpO2 and other sensors adapted to measure tissue and/or blood gas levels, blood volume sensors, and other sensors known to those who are skilled in the art. Embodiments may include portions that are radiopaque and/or ultrasonically reflective to facilitate image-guided implantation or image guided procedures using techniques such as fluoroscopy, ultrasonography, or other imaging methods. Embodiments of the system may include specialized delivery catheters/systems that are adapted to deliver an implant and/or carry out a procedure. Systems may include components such as guidewires, sheaths, dilators, and multiple delivery catheters. Components may be exchanged via over-the-wire, rapid exchange, combination, or other approaches.

Embodiments of the present disclosure may be implemented as computer-executable instructions, such as routines executed by a general-purpose computer, a personal computer, a server, embedded computer, or other computing system. The present technology can also be embodied in a special purpose computer or data processor that is specifically programmed, configured, or constructed to perform one or more of the computer-executable instructions explained in detail herein. The terms "computer" and "computing device," as used generally herein, refer to devices that have a processor and non-transitory memory, as well as any data processor or any device capable of communicating with a network. Data processors include programmable general-purpose or special-purpose microprocessors, programmable controllers, ASICs, programming logic devices (PLDs), or the like, or a combination of such devices. Further, as discussed previously, some or all of the processing can be accomplished by use of at least one of a MMIC, SAW filter, tapped delay line, operational amplifier, active or passive, linear or non-linear analog circuit, or other circuit or device capable of processing an electrical signal as known to one having skill in the art. Computer-executable instructions may be stored in memory, such as RAM, ROM, flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The above detailed description of embodiments of the technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments. For example, although this disclosure has been written to describe devices that are generally described as being used to create a path of fluid communication between the LA and RA, the LV and the right ventricle (RV), or the LA and the coronary sinus, it should be appreciated that similar embodiments could be utilized for shunts between other chambers of heart or for shunts in other regions of the body.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method for monitoring a shunting element implanted in a patient and having a lumen fluidly coupling a first body region and a second body region of the patient, the method comprising:
    applying an electrical input to a first contact region and a second contact region of the shunting element, wherein the first contact region is spaced apart from the second contact region;
    measuring an electrical output that results from the electrical input;
    calculating, via a processor, an electrical parameter associated with the shunting element based, at least in part, on the electrical output, wherein the electrical parameter varies based on a size of the lumen of the shunting element; and
    determining, via the processor, the size of the lumen based, at least in part, on the electrical parameter.

2. The method of claim 1 wherein the electrical input comprises a voltage waveform and the electrical output comprises a resulting current waveform.

3. The method of claim 2 wherein the voltage waveform is a first sinusoidal waveform and the resulting current waveform is a second sinusoidal waveform.

4. The method of claim 3 wherein the electrical output comprises a magnitude and a phase of the second sinusoidal waveform.

5. The method of claim 1 wherein the electrical parameter comprises one or more of: a capacitance value, an inductance value, a resistance value, a waveguide cutoff frequency, or a resonant frequency.

6. The method of claim 1 wherein:
    the shunting element comprises an interior frame structure defining the lumen and an exterior frame structure at least partially surrounding the interior frame structure,
    the first contact region is located on the interior frame structure, and
    the second contact region is located on the exterior frame structure.

7. The method of claim 6 wherein the electrical parameter comprises a capacitance value between the interior and exterior frame structures.

8. The method of claim 1 wherein:
    the lumen extends between a first portion and a second portion of the shunting element,
    the first contact region is located at the first portion, and the second contact region is located at the second portion.

9. The method of claim 8 wherein the electrical parameter comprises an inductance value, a resistance value, a waveguide cutoff frequency, or a resonant frequency.

10. The method of claim 1 wherein the shunting element includes at least one shape memory component, and wherein the first and second contact regions are on the shape memory component.

11. The method of claim 10 wherein the electrical parameter comprises a resistance value of the shape memory component.

12. The method of claim 1 wherein the electrical input is applied by a component implanted in the patient's body.

13. The method of claim 1 wherein the processor is implanted in the patient's body.

14. The method of claim 1, further comprising transmitting, via the processor, the size of the lumen to a device external to the patient's body.

15. The method of claim 1, further comprising transmitting the electrical output to a receiver external to the patient, wherein the processor is carried by the receiver.

16. The method of claim 1, further comprising displaying the determined lumen size on a display external to the patient.

17. The method of claim 1 wherein determining the size of the lumen comprises determining a diameter of the lumen.

18. A system for shunting fluid between a first body region and a second body region of a patient, the system comprising:
    a shunting element having a lumen extending therethrough and configured to fluidly couple the first and second body regions when the shunting element is implanted in the patient, the shunting element including a first contact region and a second contact region spaced apart from the first contact region;
    a signal generator electrically coupled to the first and second contact regions and configured to apply an input signal thereto;
    a processor operably coupled to the shunting element and the signal generator; and
    a memory storing instructions that, when executed by the processor, cause the system to perform operations comprising:
        measuring an output signal that results from the input signal applied by the signal generator;
        calculating an electrical parameter associated with the shunting element based at least in part on the output signal, wherein the electrical parameter varies based on a size of the lumen of the shunting element; and
        determining the size of the lumen based at least in part on the electrical parameter.

19. A system for shunting fluid between a first body region and a second body region of a patient, the system comprising:
    a shunting element having a lumen extending therethrough and configured to fluidly couple the first and second body regions when the shunting element is implanted in the patient;
    at least one electronic component carried by the shunting element and comprising a conductive elastomer or a time-of-flight sensor, wherein the at least one electronic component is configured to generate and/or receive a signal with one or more parameters, wherein the one or more parameters vary based on a size of the lumen;
    a processor operably coupled to the shunting element and the at least one electronic component; and a memory storing instructions that, when executed by the processor, cause the system to perform operations comprising:
  receiving the signal from the at least one electronic component; and
  determining the size of the lumen based, at least in part, on the one or more parameters of the signal.

20. The system of claim 19 wherein:
  the at least one electronic component comprises the conductive elastomer;
  the signal comprises a resistance value of the conductive elastomer; and
  the operations comprise determining the size of the portion of the lumen based, at least in part, on the resistance value.

21. The system of claim 20 wherein the conductive elastomer is disposed circumferentially or helically around the shunting element.

22. The system of claim 19 wherein:
  the at least one electronic component comprises the time-of-flight sensor;
  the signal comprises a time-of-flight signal; and
  the operations comprise determining the size of the portion of the lumen based, at least in part, on the time-of-flight signal.

23. The system of claim 22 wherein the time-of-flight sensor is configured to emit an ultrasonic, radiofrequency, or optical signal across a segment of the lumen.

24. A method for monitoring an implantable device implanted in a patient, wherein the implantable device comprises a lumen fluidly coupling a first body region of the patient to a second body region of the patient, the method comprising:
  applying an electrical input to an element or elements located on or adjacent to the lumen;
  measuring an electrical output resulting from the electrical input;
  calculating, via a processor, an electrical parameter associated with the implantable device based, at least in part, on the electrical output, wherein the electrical parameter varies based on a size of the lumen of the implantable device; and
  determining, via the processor, the size of the lumen based, at least in part, on the electrical parameter.

* * * * *